United States Patent [19]

Aubry et al.

[11] Patent Number: 4,946,354
[45] Date of Patent: Aug. 7, 1990

[54] HYDRAULIC DEVICE FOR INDIVIDUAL CONTROL OF PITCH OF A ROTOR BLADE

[75] Inventors: Jacques A. Aubry, Cabries; Michel Deguise, Mallemort, both of France

[73] Assignee: Aerospatiale Societe Nationale Industrielle, Paris, France

[21] Appl. No.: 285,167

[22] Filed: Dec. 15, 1988

[30] Foreign Application Priority Data

Dec. 15, 1987 [FR] France ................................ 87 17500

[51] Int. Cl.⁵ .............................................. B64C 27/72
[52] U.S. Cl. .................................. 416/158; 416/157 A
[58] Field of Search .............. 416/158, 114, 98, 157 A

[56] References Cited

U.S. PATENT DOCUMENTS

| | | | |
|---|---|---|---|
| 2,151,216 | 3/1939 | Larsen | 416/158 |
| 2,427,939 | 9/1947 | Woods | 416/158 X |
| 2,593,335 | 4/1952 | Neale | 416/158 X |
| 2,606,621 | 8/1952 | Neale | 416/158 X |
| 2,703,147 | 3/1955 | Peterson | 416/158 X |
| 3,119,454 | 1/1964 | Leoni | 416/158 X |
| 3,276,332 | 10/1966 | Jaffe | 416/158 X |
| 3,292,710 | 12/1966 | Grut | 416/158 X |
| 4,379,678 | 4/1983 | Carlock et al. | 416/98 |
| 4,534,704 | 8/1985 | McArdle | 416/98 X |
| 4,815,937 | 3/1989 | Aubry et al. | 416/140 |

FOREIGN PATENT DOCUMENTS

| | | | |
|---|---|---|---|
| 729412 | 12/1942 | Fed. Rep. of Germany | 416/158 |
| 3614371 | 10/1987 | Fed. Rep. of Germany | 416/158 |
| 605045 | 7/1948 | United Kingdom | 416/158 |
| 2090214 | 7/1982 | United Kingdom | 416/158 |

Primary Examiner—Edward K. Look
Assistant Examiner—John T. Kwon
Attorney, Agent, or Firm—Pollock, Vande Sande & Priddy

[57] ABSTRACT

A hydraulic device for the individual control of the pitch of a helicopter rotor blade by a rotary hydraulic jack, the stator vanes of which are integral with a sleeve fitted on the hub. The jack rotor carries rotor vanes movable relative to the stator vanes and delimiting with these chambers of variable volume fed by a servo-distributor controlled as a function of pilot signals and signals from a detector of the angular position of the blade about its pitch axis. The jack is integrated in a pitch bearing and in an elastic ball joint integrated in a rotary hydroelastic shock absorber with vanes for lamination of a viscous fluid. The shock-absorber rotor is connected rigidly in terms of rotation about the pitch axis to the rotor of the jack and is connected to the blade by a rigid cuff.

51 Claims, 5 Drawing Sheets

HYDRAULIC DEVICE FOR INDIVIDUAL CONTROL OF PITCH OF A ROTOR BLADE

FIELD OF THE INVENTION

The subject of the present invention is a hydraulic device for the individual control of the pitch of a rotor blade, i.e., a device by means of which the pitch of a rotor blade can be controlled directly by a rotary hydraulic jack interposed between the root of the said blade and the rotor hub, to which the blade is attached and articulated for pitch control, the hydraulic feed of this jack being obtained by means of a preferably electrically controlled servo-distributor, the servo-distributor being mounted on the hub and being driven in rotation about the axis of rotation together with the hub itself, so as to assume a substantially fixed relative position in relation to the hub and to the corresponding blade.

The new hydraulic device according to the invention, intended essentially for equipping rotor hubs and main rotors of helicopters, which are variable-pitch rotors, and for equipping tilting propellers or tilting rotors of convertible aerodynes, which are likewise variable-pitch rotors, allows the individual control of each of the blades of the rotor or rotors of such rotary-wing aircraft, in order, on the one hand, to ensure the conventional control of the rotor or rotors, by introducing the general pitch, which is constant whatever the azimuth of the rotating blade, but also the cyclic pitch, which varies sinusoidally over one revolution of the said blade, and, on the other hand, to make it possible, where appropriate, to add any dynamic variation of the pitch to these variations of the general and cyclic pitches, so as to obtain the multicyclic control of the rotor or rotors.

This independent control of each blade makes it possible, on the one hand, to achieve the best possible monocyclic control of the rotor or rotors and, on the other hand, by means of the multicyclic control of the blades, to introduce a system of active vibration control into the rotor or rotors, these arrangements affording high antivibration efficiency and considerable performance gains, especially at maximum speed.

BACKGROUND OF THE INVENTION

It is well known that helicopters are conventionally and mainly piloted, on the one hand, by controlling the general pitch of the blades of the main rotor, this control making it possible to vary the overall lift of the rotor, and, on the other hand, by controlling the same blades so as to make it possible to incline the rotor disc, the result of the combination of these two controls being the possibility of varying the amplitude and inclination of the mean resultant force generated by the rotor and consequently of piloting the helicopter which this rotor supports.

In most helicopters flying at the present time, these controls are introduced by means of a complex device with swashplates, these swashplates making it possible to generate simultaneously on the blades of the rotor, on the one hand, the control of the general pitch of the blades as a result of their axial shift along the axis of the rotor and, on the other hand, the sinusoidal control of the pitch or monocyclic control, the pulsation of which is equal to the rotational speed of the rotor, as a result of their angular tilting relative to the axis of the rotor.

In general, the swashplates used for controlling the variation of the pitch of the blades of a rotary-wing aircraft, such as a helicopter, are mounted round the rotor mast and comprise a rotary plate connected by means of links to the pitch levers of the rotor blades and driven in rotation about the rotor mast by the hub or the mast of the rotor and by means of at least one linkage, this rotary plate being mounted rotatably by means of at least one ball bearing on a non-rotary plate mounted round the rotor mast and sliding axially along the latter under the action of a collective-pitch lever actuated by the pilot, the non-rotary plate also being articulated relative to the rotor mast by means of a knuckle, in such a way that the plates can oscillate in all directions about the knuckle as a result of the action of connecting rods of the pilot controls on the non-rotary plate, this action being controlled from the cyclic control stick.

Moreover, the vibration levels recorded on helicopters are usually higher than those recorded on transport planes. The main cause of these high vibration levels is the main rotor of the helicopters, on which substantial alternating aerodynamic and dynamic forces are generated and, after being transmitted to the helicopter fuselage, result in high periodic accelerations, especially at high speed. Irrespective of the aim of achieving the best possible dynamic behavior of the rotors and structures, the means used hitherto for limiting these vibration phenomena are passive means of the anti-vibration or suspension type which are arranged in the region of the rotor head, at the connection between the rotor and fuselage and the fuselage itself. In parallel with the passive means, the future of which seems limited because their mass risks making it impossible to meet the increasingly stringent requirements of comfort associated with the increasingly high cruising speeds of modern helicopters, active means of controlling the vibrations are likewise being researched and developed.

As a particular instance of these active vibration control means, there has already been a proposal to use a multicyclic control, the principle of action of which, in this use, involves generating alternating forces which, in the region of the main rotor, oppose the vibration-generating forces.

In comparison with a monocyclic pitch control introduced by means of swashplates, this multicyclic control is a more elaborate control containing several harmonics of the rotational speed. It can also be used to seek an improvement of the flight qualities and performance gains, especially by controlling the stall on the lagging blade.

It should be noted, furthermore, that a multicyclic control of the main rotor of a helicopter, as a system for the active control of vibrations, is advantageously suitable for integration in a system of electrical flight controls, making it possible to obtain a generalized automatic control of the helicopter.

In a first known embodiment, it was proposed to introduce the multicyclic control in the region of the control jacks of the non-rotary plate of a conventional swashplate device, so that the multicyclic control is simply added to the conventional general and monocyclic control, corresponding to a fixed reference constant, that is to say without taking into account the rotation about the axis of the rotor. The only usefulness of such an embodiment is that it preserves the conventional monocyclic control chain with swashplates and pitch links, to which are added multicyclic linear actuators, such as linear hydraulic jacks, which are connected in series with the control jacks of the longitudinal shift and inclination of the non-rotary plate. Thus, by careful choice of the amplitude and phase of the commands sent to the three multicyclic control jacks, it is therefore possible to prevent the generation of vibrations in the region of the main rotor.

However, the disadvantage of such an embodiment is that linear actuators and their power control circuits have to be added to a swashplate device already heavy, bulky and complex itself, and that, furthermore, it is necessary to reinforce the swashplates themselves to a considerable extent. This therefore means an increase in cost, complexity and weight of such an installation mounted round the rotor mast.

In contrast to such a superposition of a conventional monocyclic control and a multicyclic control, there has already been a proposal to obtain the multicyclic control by means of a direct rotating-reference control via actuating devices which each rotate together with the blade of which the pitch is controlled.

Various embodiments of this type were presented in an article by Mr. Kenneth F. Guinn, entitled "Individual blade control independent of a swashplate" and published in the July 1982 issue of the "Journal of American Helicopter Society".

This article presents embodiments of the control of a main helicopter rotor which depart from the conventional concept by placing control actuators, corresponding power supplies and computers in the rotary control system. In a first embodiment, the purpose of which is to improve the mechanical pitch-control device and which functions as a means making it possible to introduce a higher-harmonic control into the rotor, the multicyclic control comprises an actuator, namely a linear hydraulic jack, mounted axially along the rotor mast and outside the upper part of the latter, the hydraulic supply circuit and the pump being accommodated inside the rotor mast. Whereas, in this first embodiment, the multicyclic control is used in parallel with the monocyclic control, the other embodiments proposed in this article no longer have swashplates allowing the use of a monocyclic control, and some of these embodiments possess series arrangements of a linear hydraulic jack, its hydraulic supply means, especially the pump, and a connecting rod for actuating the pitch-control lever of the corresponding blade, these elongate arrangements being placed axially either on the inside of the rotor mast or on the outside and along the latter, depending on whether the jacks are to be protected against the ambient medium, irrespective of the thermal problems presented by the functioning of these devices, or whether it is desirable to profit from the rotary movement of the jacks to obtain a ventilator effect which improves their cooling. In another configuration, to ensure that the cooling of the controls during high-speed operation when the temperature of the system is at a maximum is sufficient because of the large volume of displaced air, the controls are placed on the rotor hub and comprise, for each blade, a hydraulic pump mounted on the central part of the hub, fed via a conduit within the rotor mast and itself feeding a linear hydraulic jack which is fastened spanwise to a radial arm of the hub and of which the outer radial end in relation to the axis of rotation of the rotor actuates two bent pitch-control levers for controlling the pivotings of the blade about its pitch-changing axis. In this configuration, the double lever mechanisms actuating the blade require supports which are extremely long and therefore heavy and not very rigid, the jacks are fed via relatively long pipelines and the centrifugal forces subject the structures to stress and influence the functioning of the elements of the device mounted in the direction of the span. In another configuration, the actuators are still linear jacks, but these are arranged in the direction of the chord of the blade, thus making it possible to mount them together with their lever mechanisms nearer to the rotor mast and reduce the weight of the hydraulic pipelines and supports of the lever mechanisms. An alternative version of this configuration which still uses jacks mounted in the direction of the chord is described in U.S. Pat. No. 4,379,678 and eliminates all the bent levers and the lever supports by means of which the jacks actuate the levers for controlling the pitch of the blades, but at the expense of a mounting of the jacks on bulky transverse articulated supports. In the abovementioned U.S. Patent, the rotor equipped with a device for the individual control of the pitch of each blade is a rotor on which each blade has its root coupled to the outer radial end of a flexurally and torsionally pliant arm of the hub, driven in rotation by a tubular rotor mast. An electrohydraulic actuator which is a triple linear jack is arranged along the chord, perpendicularly to the axis of the blade, in the region of the root of the latter, and the rod of the jack acts as a pitch-controlling link actuating a pitch-control lever fixed to the blade root. Each of the three stages of the electrohydraulic jack is connected to an independent hydraulic circuit comprising a pump and a hydraulic tank, and each of the three stages of the jack is controlled simultaneously, independently of the other two stages, by an electrical-signal generator which sends control commands to the servo valves associated with the jacks, the signal generator being supplied with electrical current produced by an alternator which is driven in rotation, at the same time as a hydraulic pump, by means of a common shaft carrying a drive pinion in engagement with a gear wheel fastened to the upper end of a fixed (non-rotary) standpipe passing through the tubular rotor mast. Since the electrohydraulic jack, each electrical-signal generator, each corresponding alternator and each hydraulic pump of the three independent circuits, each feeding one of the stages of the jack, are fastened to the rotor hub and therefore driven in rotation together with the latter, each pump and each corresponding alternator are driven as a result of the rotation of the common drive pinion about the fixed gear wheel. The transverse shifts of the rod of the jack oriented along the chord are transmitted to a bent pitch lever by means of a U-shaped transmission linkage, the base of which is connected to the rod of the jack and the two wings of which extend on either side of the jack and have their free end coupled to one arm of the bent pitch lever. The other arm of this lever is integral in terms of rotation with the inner radial end of a radial extension of the blade which prolongs the latter, towards the rotor hub, beyond a lag hinge which articulates the blade on the two radial branches of the corresponding hub arm shaped as a yoke with two flexurally and torsionally pliant branches, between which the blade extension is accommodated. Furthermore, a linear shock absorber for damping the angular oscillations of the lagging blade is coupled between two offset fastenings, of which one is on the blade root and the other on the blade extension.

Because of the crowding caused on the rotor head by the presence not only of the jacks mounted along the chord, but also of the corresponding hydraulic circuits, together with the associated pipelines, pumps, tanks, filters and valves, and of the electrical and optical circuits for generating and transmitting control commands, it proved necessary to provide a fairing for the rotor hub, in order to protect the controls and reduce the aerodynamic drag arising as a result of their presence on the hub. Furthermore, the hydraulic pipelines were accommodated at least partially in this hub fairing, so that the latter at the same time functions as a heat exchanger.

However, such a system of complex structure presents considerable problems of mounting, alignment and also wear of the gaskets in the region of the linear jacks used. For these reasons, the abovementioned review article proposes another configuration having a more efficient jack arrangement. This configuration comprises two pitch-control levers and four linear jacks for each blade. Each blade jack is controlled by a different hydraulic and electrical power package which is located on the rotor hub. Four computers, likewise placed on the hub, process all the control data going to the rotor blades or coming from these and originating from blade-position detectors. The hydraulic power packages are driven by fixed pinions mounted on standpipes. One standpipe is placed in the tubular rotor mast and comes out above the rotor hub, and another standpipe is placed outside the mast and comes just under the hub, so that when the rotor rotates the hydraulic power packages are driven by gear trains, themselves driven in rotation about fixed pinions. Two of the four hydraulic power packages are provided above the hub and the other two below it. The control commands from the electrohydraulic servo valves equipping the four linear jacks, and the blade configuration or blade position data are transmitted via an interface between the rotary part of the rotor and the non-rotary part, by means of optical fibers interacting with redundant optical collectors, of which one is located above the rotor hub and the other below it. As regards the driving of the blade in rotation about its pitch-changing axis, each blade is integral in terms of rotation with two pitch-control levers, perpendicular to the pitch axis of the blade and to its drag plane, of which one extends above this drag plane and the other below it. The free end of each of the two pitch-control levers is articulated on the rods of two linear jacks mounted along the chord, in opposition, one fore of and the other aft of the pitch axis of the blade. The four jacks of each blade are thus distributed between two upper jacks and two lower jacks which are all arranged along the chord of the blade and in paired opposition, in order to control the pitch-control tilts about the pitch-changing axis of the blade and thus bring about the angular variations of the blade about this axis. Each of the four linear jacks associated with each blade possesses an electrohydraulic control servo valve, shutter valves and a branch circuit for limiting the loads experienced, and also linear transducers for the position of the piston of the jack and of the overload shutter valves. All the jacks are accommodated in two jack supports which also perform the function of hydraulic collectors, with quick-acting connections for connecting the jacks to the corresponding hydraulic circuits at the time of assembly. Thus, four rotary electrohydraulic servo controls are used for each blade, their other remaining components, namely a tank, a filter module and one or two computers, being combined to form an integral electrohydraulic unit which is placed near the associated pump and alternator. A hub fairing comprising two matching convex discs is fastened to the rotor hub, in order to fair the latter and protect the controls.

In comparison with a conventional swashplate device which, arranged round the rotor mast between the rotor and the fuselage, causes considerable drag in cruising flight, placing the multicyclic flight controls on the rotor hub with a suitable fairing and eliminating the swashplates and the corresponding control linkages make it possible to reduce the rotor drag to an appreciable extent. Furthermore, above all, the individual blade control ensures high control flexibility by making it possible to introduce complex control laws at the same time as the conventional general and cyclic pitch inputs to the blades. This makes it easier to use both harmonic and non-harmonic control inputs in order to improve the operating loads of the rotor, the vibration qualities, the performances and/or the maneuverability capacities of the craft. It is possible in this way to damp the excitations of the blades before they can cause undesirable vibrations, and by means of higher harmonics it is possible to bring about elimination or breakaway of ice deposited on the blades and thus ensure deicing.

However, although single-acting jacks of the non-compensated type can be used in this configuration, it is nonetheless true that these advantageous effects arise as a result of the use of a complex structure comprising, for each blade, four rotary electrohydraulic servo controls installed above and below the rotor hub and the blade roots and also round the upper part of the rotor mast, and therefore such an installation remains highly complex, costly, bulky and of untried reliability.

The same applies essentially to the system for the individual control of the pitch of the blades of a helicopter rotor which is described in U.S. Pat. No. 4,519,743. In this patent, the root of each blade, the pitch of which is to be controlled individually, is retained in a metal yoke fixed to the inner radial reinforcement of a laminated ball joint, the outer radial reinforcement of which is retained on a rigid supporting arm fixed to the hub. In the region of the laminated ball joint which allows the movements of the blade in terms of flapping and drag and about its pitch-changing axis, a flexible metal strip connecting the supporting arm of the hub to the retaining yoke of the blade root carries strain gages which supply output signals indicating the torsional deformation of the blade about its pitch axis and under flapping. The dynamic response of the blade can thus be monitored in order to prepare negative feedback signals in the control loop which, moreover, includes essentially electromechanical means for adjusting the angular position of the blade about its pitch-changing axis. Furthermore, at least one accelerometer is mounted on the blade, in such a way that it is sensitive to the accelerations in a direction perpendicular to the surface of the blade, so as to be sensitive to the deformations under flapping and supply negative feedback signals likewise fed into the control loop. The pitch of each blade of the rotor is controlled individually by a servo-motor belonging to each blade and by means of a mechanical transmission comprising gears and a pinion/crank assembly. The servo-motor is a motor/tachometer assembly mounted parallel to the axis of the rotor mast between two radial flanges supported by the latter. A pinion mounted on the output shaft of the motor is in engagement with a bevel wheel which drives in rotation a radial shaft mounted pivotably in bearings carried by supports fixed to the rotor hub, and this radial shaft drives in rotation a crank, the end of which carries a crank pin articulated on the lower end of a pitch-control link, the upper end of which is articulated on a transverse diametral axle intersecting the pitch-changing axis of the blade and fastened to the retaining yoke of the root of this blade and to the inner radial reinforcement of the laminated ball joint. Thus, any rotation of the motor in one direction or the other is transmitted, via output pinions of the motor, to the crank of which the crank pin exerts a pull or a push on the pitch-control link, in order thereby to control the angular variations of the blade about its pitch-changing axis.

The disadvantages of such a solution are that the position of the motor assemblies along the rotor mast and on the outside of this and the presence of the reduction-pinion stages, the supports of their bearings and the crank/crank pin assemblies and pitch-control links on a plate of the rotor hub give the device a considerable bulk which causes a likewise considerable aerodynamic drag and which adds to the complexity of the structure, having adverse effects on the production and maintenance costs.

SUMMARY OF THE INVENTION

The present invention proposes to overcome the above-mentioned disadvantages of the known devices for the individual control of the pitch of the rotor blades, or multicyclic control device, and more particularly the subject of the invention is a hydraulic device of this type which has very high compactness, excellent reliability, high efficiency and accuracy in the control of the trim of the blades and reduced production and maintenance costs.

Another object of the invention is to provide a hydraulic device for the individual control of the pitch of a rotor blade, which has high operating flexibility and which is designed to achieve a considerable reduction of the vibrations generated in the region of the rotor blades by means of a multicyclic control of their pitch.

Another object of the invention is to provide a hydraulic device for the individual control of the pitch of a rotor blade, which is advantageously suitable to be integrated in elements for the articulation and connection of a blade to a rotor hub and with which, preferably, at least one shock absorber for damping the angular oscillations of the blade under drag can be combined or integrated, without too great an increase in the complexity of the structure or the bulk of the device as a whole.

To achieve this, the subject of the invention is a hydraulic device for the individual control of the pitch of a blade of an aerodyne rotor, such as a helicopter rotor or a tilting propeller of a convertible aircraft, the device comprising:

at least one hydraulic actuator for controlling the pitch of the blade, the said actuator being intended to be mounted on the rotor and driven in rotation with this, each actuator being connected to at least one hydraulic power circuit by means of at least one hydraulic line, on which is mounted at least one servo-distributor likewise rotating with the rotor and controlling the supply of pressurized hydraulic fluid to at least one actuator, each servo-distributor receiving control signals prepared from pilot control commands and/or from a computer preparing control commands from signals indicating the state of at least one blade coming from at least one detector of the position and/or movements and/or deformations of at least one blade, and, according to the invention this hydraulic device is defined in that at least one actuator, but preferably each of them, is a rotary hydraulic jack, the axis of rotation of which coincides with the longitudinal pitch-changing axis of this blade and of which the stator is fixed to the central part of the hub of the rotor head of the aerodyne and the rotor, coaxial relative to the stator, is connected in terms of rotation to the blade, and which possesses at least one inner chamber of variable volume, delimited at least partially between the jack rotor and the jack stator and connected to at least one servo-distributor controlled so that the supply of pressurized hydraulic fluid to the chamber and its increase in volume or the drainage of the chamber and its decrease in volume cause, about the pitch axis of the blade, a rotation of the jack rotor relative to the jack stator which is transmitted to the blade and which varies its pitch It is clear that, in comparison with the use of linear actuators, as in the state of the art, the use of rotary jacks coaxial relative to the pitch axis of the blade makes it possible to reduce the bulk and complexity of each device in the region of the rotor hub very substantially and as far as possible prevent the introduction of disruptive control flexibility or play between the jacks and the blades.

Although it is possible to use single-acting rotary jacks returned, for example, elastically towards a position of minimum pitch, from which the blade is shifted angularly about its pitch axis by the admission of pressurized hydraulic fluid into the chamber or chambers of the rotary jack or rotary jacks, it is advantageous, in terms of operating flexibility, efficiency and safety, there being no appreciable effect on the increase of volume, to use, in each device, at least one rotary hydraulic jack which is a double-acting jack, but preferably each of the jacks of each device is such a double-acting jack, comprising at least two inner chambers of variable volume connected to at least one servo-distributor controlled in such a way that the feeding of one chamber and its increase in volume are simultaneous with the corresponding drainage of another chamber and its decrease in volume, so that the rotation of the jack rotor, and therefore of the blade, relative to the jack stator and about the pitch axis of the blade can be controlled in the two opposite directions.

According to the invention, the stator and the rotor of at least one jack, but preferably of each of them, are two substantially tubular members coaxial about the pitch axis of the blade, and they each have, opposite the other, a lateral surface of revolution about their common axis, at least one jack vane, but preferably two vanes diametrically opposed relative to this common axis, projecting on each of the lateral surfaces and extending to the immediate vicinity of the opposite lateral surface, and the jack vane or jack vanes projecting on one of the lateral surfaces being offset circumferentially about the pitch axis of the blade in relation to the vane or vanes projecting on the other lateral surface, in order to delimit at least two, but preferably four chambers of variable volume, with a small leakage flow from one chamber to the other via the small radial play between the vanes and the mutually opposite surfaces of revolution. This small radial play, if appropriately combined with the large axial dimensions of the vanes, causes a considerable lamination of the hydraulic fluid, thus ensuring sufficient sealing between the various chambers of each rotary hydraulic jack.

In a preferred embodiment favorable for the integration of the rotary hydraulic jack in other elements advantageously used for connecting and articulating the blades to the rotor hub, one of the lateral surfaces of revolution of each rotary hydraulic jack is a cylindrical surface of circular cross-section, on which each projecting vane has substantially the form of a spherical segment of a convexity facing or turned towards the other lateral surface which is a surface in the form of a spherical cap, on which each projecting vane likewise has substantially the form of a spherical segment connected by means of its convex face to the spherical cap and having a face in the form of a portion of a cylinder of circular cross-section opposite the cylindrical surface.

To make the changes of pitch of the blade easier, the device advantageously possesses at least one axial stack, substantially concentric relative to the pitch axis of the blade, of at least one rotary hydraulic jack and of at least one cylindrical pivot bearing for the pitch of the blade and for fixing on the hub, which allows the blade to rotate about its pitch axis relative to the hub.

In order, where appropriate, to ensure some redundancy which may be necessary for safety reasons, it is clear that each hydraulic device for the individual control of the pitch of a blade can comprise several rotary hydraulic jacks stacked either axially or radially relative to the pitch-changing axis of the blade, and the rotor of at least one rotary hydraulic jack, but preferably of each of them, is mounted rotatably relative to the corresponding jack stator by means of at least one cylindrical bearing. It is advantageous if this cylindrical bearing at the same time forms a pivot bearing for the blade pitch and for fixing on the hub. Advantageously, at least one cylindrical bearing is a bearing with two axially spaced pairs of cylindrical bearing surfaces opposite one another, the rotor and the stator of at least one rotary hydraulic jack being integrated between the said pairs of bearing surfaces. This makes it possible to ensure better axial and rotational guidance of the rotor in relation to the corresponding jack stator.

According to the invention, the hydraulic device for the individual control of the pitch of a blade also possesses a ball joint which is centered substantially on the pitch axis of the blade and which comprises at least one element made of an elastic material which is substantially and at least partially in the form of at least one portion of at least one spherical cap and which is retained between two rigid supports, of which one is intended to be integral with the blade in terms of torsion about the pitch axis of the blade and the other is integral in terms of rotation with the rotor of at least one rotary hydraulic jack of the device about the pitch axis, and so that the ball joint is rigid circumferentially about the pitch axis, whilst at the same time allowing, about its center, a relative freedom of angular movement of the blade under flapping and drag as a result of the shearing of the elastic material.

In this case, to obtain a good transmission of the pitch control torque between the rotor of the rotary jack and the rigid support of the ball joint to which the blade is connected, the element or elements made of elastic material of the ball joint comprise two radially serrated or notched rings adhesively bonded radially to the two rigid supports of the ball joint, between mutually opposite serrated or notched surfaces of the two rigid supports, in order to stiffen the connection between the ball-joint support connected to the blade and the rotor of at least one rotary hydraulic jack in terms of rotation about the pitch axis of the blade, so that any rotation of the jack rotor relative to the jack stator is transmitted to the ball-joint support connected to the blade, and therefore to the blade. In this case, it is advantageous if the surface of revolution in the form of a spherical cap, forming one of the two surfaces of revolution delimiting the inner chambers of the corresponding rotary hydraulic jack, and the vanes of this jack in the form of spherical segments are concentric relative to the ball joint.

Furthermore, it is advantageous if at least one cylindrical pitch and fixing bearing is, on the one hand, connected to that of the rigid supports of the ball joint which is integral in terms of rotation with at least one jack rotor and, on the other hand, substantially coaxial relative to the other rigid support of the ball joint. Moreover, in order to reduce the bulk of the device, simplify its structure and prevent the generation of off-center or offset forces and torques during operation, the ball joint is advantageously, on the one hand, radially in series, relative to the pitch axis of the blade, with the axial stack of at least one rotary hydraulic jack and of at least one cylindrical pitch and fixing bearing and, on the other hand, substantially concentric relative to the corresponding cylindrical bearing or bearings.

So that the multicyclic control device according to the invention functions in a closed loop, that is to say possesses information relating to the position assumed by the blade about its pitch axis, and for the feedback to the control of the rotary jack or rotary jacks of each device, the latter possesses at least one detector of the position of the corresponding blade, this detector advantageously being a rotation transducer of the inductive or capacitive type which comprises at least one movable member connected in terms of rotation to the rotor of at least one rotary jack and mounted rotatably relative to at least one member fixed in relation to the stator of this rotary jack, so as to supply an output signal indicating the respective relative angular position of the movable and fixed members of the rotation transducer.

In a highly compact embodiment, at least one fixed member of each rotation transducer is seated in an axial recess formed in an axial end part of the stator of the jack and/or of a cylindrical bearing surface of a pitch and fixing pivot bearing in an axial stack with this jack stator, and at least one movable member of each rotation transducer is mounted rotatably, about an axis parallel to the pitch axis of the blade, in the said fixed member or about this and is integral in terms of rotation with a pinion outside the jack and the corresponding bearing and in engagement with the toothing of a ring integral in terms of rotation with the rotor of this jack. In an advantageous exemplary embodiment, the toothed ring has an annular form of revolution defined by the rotation about the pitch axis of the blade of a cross-section in the form of a U laid horizontally, so that the ring has a substantially radial flange supporting two coaxial tubular collars, of which one is fastened to the rotor of the jack and the other carries the toothing with radial teeth in engagement with the corresponding pinion of each rotation transducer, each pinion being seated in the recess delimited between the two collars and by the flange of the ring which is thus shaped as a cover for protecting the pinion or pinions projecting axially relative to the stator of the jack and/or to the bearing surface of the bearing in an axial stack with this jack stator.

According to another characteristic particular to the invention, the hydraulic device for the individual control of the pitch of a blade also possesses a hydraulic shock absorber for damping the angular movements of the blade under drag.

Advantageously, to assist the functional combination of this hydraulic shock absorber with the other components of the device, this hydraulic shock absorber is a rotary shock absorber of the type comprising a stator and a rotor which are substantially coaxial and which between them delimit at least one inner shock-absorber chamber filled with the hydraulic fluid, such as a silicone gel or oil of high viscosity, and at least one shock-absorber vane integral with the rotor or stator of the shock absorber and subdividing the inner chamber into two damping chambers connected to one another by lamination means, so that any relative rotation of the shock-absorber, stator and rotor about their common axis causes a rotation of each vane in the corresponding inner chamber, thereby compressing one of the two damping chambers and causing expansion in the other, so as to ensure a damping of the rotational movement as a result of the lamination, via the lamination means, of the fluid circulating from the compressed chamber towards the expanded chamber, the shock-absorber stator being integral in terms of rotation about the pitch axis of the blade, with the rotor of at least one rotary hydraulic jack, and the shock-absorber rotor being connected to the blade. The lamination means of the shock absorber can be mounted in the rotor and/or in the stator of the shock absorber or in a shock-absorber vane, but in a simplified structural embodiment these lamination means comprise a narrow passage between the free end of each shock-absorber vane carried by the shock-absorber rotor or stator and an opposite surface on the shock-absorber stator or shock-absorber rotor respectively. Each inner shock-absorber chamber is sealed by at least one member made of elastic material, connecting the shock-absorber rotor to the shock-absorber stator.

Advantageously, excellent functional interactions are obtained if the hydraulic shock absorber is radially in series, relative to the pitch axis of the blade, with at least one rotary hydraulic jack and/or at least one axial stack of at least one rotary hydraulic jack and of at least one cylindrical pitch and fixing bearing.

In this case, in order to reduce the bulk and further simplify the structure, it is advantageous if the hydraulic shock absorber is at least partially integrated in the ball joint, at least one inner shock-absorber chamber being delimited at least partially between the rigid supports of the ball joint and/or in a recess of at least one of these rigid supports.

In an ideal embodiment, the shock-absorber stator and rotor and at least one member made of elastic material connecting them to one another consist respectively of the rigid support of the ball joint which is integral in terms of rotation with the rotor of at least one rotary hydraulic jack, of the rigid support of the said ball joint which is connected in terms of torsion to the blade, and of at least one element made of elastic material for connecting the rigid supports of the ball joint.

In these various cases, according to a preferred architecture, the ball joint and the rotary hydraulic shock absorber radially surround a rotary hydraulic jack, the rotor of which surrounds the jack stator radially, the shock-absorber rotor possessing a rigid annular support, in the outer radial position, and which possesses, radially inwards, portions of a concave surface adhesively bonded to elements of elastic materials likewise adhesively bonded to portions of a convex surface arranged radially outwards on the shock-absorber stator which possesses a rigid annular support, in the intermediate radial position, and which itself radially surrounds the jack stator in the inner radial position. In particular, to obtain a highly compact device, it is possible for a rotary hydraulic jack, the rotor of which surrounds the stator, to be arranged in a recess made in the inner radial face of the shock-absorber stator and/or of the rigid support of the ball joint which is connected to the rotor of the rotary jack.

However, according to an embodiment which is advantageous because it is of simplified structure, the rotor of the rotary hydraulic jack at the same time forms the shock-absorber stator. This element then has portions of outer and inner radial faces which are advantageously respectively convex and concave portions of a sphere, centered on the center of the ball joint.

Furthermore, in this simplified embodiment, the shock-absorber rotor and the rigid support of the ball joint which is integral with the blade in terms of torsion about the pitch axis of the latter can consist essentially and simultaneously of an outer radial reinforcement connected by means of the elastic material to an inner radial reinforcement, itself simultaneously forming the other rigid support of the ball joint, the shock-absorber stator carrying each shock-absorber vane projecting radially outwards, and finally the rotor of the rotary jack carrying the movable jack vane or vanes projecting radially inwards opposite the jack stator which is shaped as a cylindrical sleeve carrying the fixed jack vane or vanes projecting radially outwards. To make rotational guidance easier, it is then advantageous if the cylindrical sleeve and the inner reinforcement have on one side and/or the other of their jack vanes, in the axial direction, cylindrical bearing surfaces radially opposite one another forming a plain pitch and fixing bearing, in the region of which the sealing of the rotary jack is ensured by at least one gasket seated in a radial groove made in one of the two mutually opposite bearing surfaces. Then to allow a simplified mounting of the device on a rotor hub, the cylindrical sleeve of the jack stator advantageously has inner axial flutes, by means of which it is intended to come into engagement with outer axial flutes formed on the periphery of a protuberance of the hub, onto which the sleeve is intended to be fixed, in order to be immobilized in terms of rotation about its axis. Furthermore, at least one of the axial end parts of the cylindrical sleeve can advantageously be pierced with at least one conduit for connecting at least one chamber of variable volume of the rotary hydraulic jack to a hydraulic circuit located outside the device.

In an embodiment which is of simple structure, but which ensures excellent damping of the blade under drag, the hydraulic shock absorber possesses two shock-absorber vanes substantially radial and symmetrical relative to one another in relation to the relative axis of rotation of the shock-absorber rotor and stator, the vanes being integral with the shock-absorber stator, and each of them extending substantially perpendicularly relative to the drag plane of the blade and substantially symmetrically above and below this drag plane, respectively in one of two shock-absorber chambers, each delimited by a recess extending radially and circumferentially in the rotor of the shock absorber, by a part of the radial surface of the shock-absorber stator opposite the corresponding recess in the shock-absorber rotor, and round the root of the vane engaged in this recess, and by portions of annular surfaces of the member or members made of elastic material connecting the shock-absorber stator to the shock-absorber rotor. To make it easier to produce such an assembly, the recesses of the shock-absorber rotor accommodating the shock-absorber vanes are closed radially outwards by means of a peripheral casing mounted sealingly and removably on the perimeter of the shock-absorber rotor. Furthermore, each shock-absorber vane can be fastened unremovably, for example by electron-beam welding, to that portion of the face of the shock-absorber stator which forms the bottom of a recess accommodating the corresponding vane.

The functioning of the hydraulic shock absorber is improved if, furthermore, each inner chamber of the shock absorber is connected, by means of at least one communication passage, to at least one chamber for compensating the expansions of the hydraulic damping fluid pressurized by means of a pressurizing mechanism ensuring static pressurization of the shock absorber. In this case, advantageously, the communication passage or communication passages between a compensation chamber and an inner shock-absorber chamber is or are calibrated so as to form a dynamic filter for the operating frequencies of the shock absorber. Moreover, this communication passage or these communication passages can in a simple way be delimited by a radial play between the peripheral casing, on the one hand, and the shock-absorber rotor and/or the rigid support of the ball joint, on the other hand.

The pressurizing mechanism can comprise at least one preferably elastically deformable flexible diaphragm which at least partially delimits the corresponding compensation chamber. However, it is advantageous if the flexible diaphragm is a sealed bladder seated in the compensation chamber and inflatable from outside the pressurizing mechanism. Moreover, the sealing of the compensation chamber is advantageously ensured by at least one element made of elastic material, preferably belonging to the shock absorber and/or to the ball joint. To reduce the bulk of the device even further, it is advantageous, furthermore, if at least one compensation chamber is at least partially delimited between the shock-absorber rotor and stator and/or in a recess of one of the said shock-absorber rotor and stator, the sealing of the compensation chamber being ensured by at least one viscoelastic element for connecting the shock-absorber rotor to the shock-absorber stator.

When the shock absorber comprises two diametrically opposite vanes, it is desirable, furthermore, if the device also possesses two hydraulic compensation chambers substantially symmetrical relative to one another in relation to the relative axis of rotation of the shock-absorber rotor and stator and in relation to the drag plane of the blade, each of the two compensation chambers being delimited at least partially by one of two recesses extending circumferentially in positions alternating in this direction with the recesses of the shock-absorber chambers, in one of the shock-absorber rotor and stator and/or of the rigid supports of the ball joint and/or in at least part of at least one viscoelastic element of the shock absorber and/or of the ball joint. Moreover, each inner shock-absorber chamber can be separated from each of the compensation chambers, between which it is located in the circumferential direction, by a solid part made of elastic material, integral with the element or elements of elastic material connecting to one another the shock-absorber rotor and stator and/or the two rigid supports of the ball joint.

Moreover, at least one of the pitch and fixing bearings is advantageously a plain dry bearing with at least one self-lubricating ring seated in an annular retaining groove made in that of two mutually opposite cylindrical bearing surfaces of this bearing which is located on the jack rotor and/or the shock-absorber stator and/or the rigid support of the ball joint which is connected to the jack rotor.

In addition to the components mentioned above, the hydraulic device for the individual control of the pitch of a blade according to the invention also advantageously possesses a device for the automatic take-up of the play of at least one pitch and fixing bearing.

When at least one of the pitch and fixing bearings is a plain dry bearing equipped with a self-lubricating ring in an annular retaining groove, the device for the automatic take-up of play is advantageously a hydraulic device comprising at least one compensation chamber filled with a hydraulic fluid pressurized by means of at least one pressurizing mechanism and in communication with each of the retaining grooves of the bearing via at least one conduit opening out between the bottom of the groove and the corresponding self-lubricating ring mounted sealingly in the said groove, so that the take-up of play is ensured as a result of the diametral displacement of the ring under the action of the pressure of the hydraulic fluid in the compensation chamber or compensation chambers of the play take-up device. As before, this mechanism for pressurizing a compensation chamber of the play take-up device can comprise a preferably elastically deformable flexible diaphragm delimiting at least partially the corresponding compensation chamber, and advantageously this flexible diaphragm is a sealed bladder seated in the corresponding compensation chamber and inflatable from outside the device.

In this case, in order to simplify the embodiment, at least one chamber for compensating the expansions of the hydraulic fluid of the shock absorber and its pressurizing mechanism form simultaneously and respectively a compensation chamber of the hydraulic play take-up device and its pressurizing mechanism. Furthermore, the conduit or conduits connecting a compensation chamber to a retaining groove of a ring of a bearing is or are preferably calibrated, so as to form a dynamic filter for the operating frequencies of the shock absorber.

In general, the hydraulic play take-up device can be at least partially integrated in the hydraulic shock absorber.

In order to absorb the slight axial displacements attributable to the effects of the centrifugal force on the corresponding blade and on the elements connecting the said blade to the hub, it is preferable if at least one rotary hydraulic jack of the device and, where appropriate, at least one cylindrical pitch and fixing bearing, at least one blade position sensor, a ball joint, a rotary shock absorber and a play take-up device are mounted freely in terms of limited axial translational motion as a result of an axial assembly play of the stator of the jack or jacks on the hub.

The subject of the invention is also a rotor hub intended for equipping a variable-pitch rotor of a rotary-wing aircraft and of the type comprising a central hub body centered on the axis of rotation of the hub and extensions which are radial relative to the axis of rotation and are integral with the central body and which are of a number equal to the number of blades of the rotor, so as each to ensure the connection of a blade to the hub. According to a characteristic particular to the invention, such a hub is defined in that it possesses, furthermore, hydraulic devices for the individual control of the pitch of a blade according to the invention, as defined above, which are of a number equal to the number of blades and each of which is mounted on a radial extension, so that the stator of the rotary hydraulic jack or jacks of the corresponding device is retained on the said extension and immobilized in terms of rotation about the pitch axis of the corresponding blade.

Moreover, when the rotor hub is of the type of which each radial extension supports, for connection to the corresponding blade, at least one pitch bearing and, centered on the axis of the pitch bearing, a ball joint with at least one element made of elastic material, allowing, about its center, a relative freedom of movement of the corresponding blade under flapping and under drag, as a result of the shearing of the elastic material, the hub according to the invention is defined in that at least one rotary jack of the corresponding hydraulic device for the individual control of the pitch of a blade is combined with at least one pitch bearing, and the rotor of the rotary jack or rotary jacks of the said hydraulic device is integral, in terms of rotation about the axis of the pitch bearing or pitch bearings, with one of the two rigid supports of the ball joint, between which the element or elements made of elastic material is or are mounted.

Moreover, when the rotor hub is of the type comprising, for each rotor blade, a connecting member rigid under tension, but flexible under bending and torsion, coupled by means of a footing part to a radial extension and intended to be coupled to a blade, in order to retain the blade counter to the centrifugal force and allow the flapping and drag oscillations of the blade and the angular variations of its pitch, and a member rigid under bending and torsion, connected to the said radial extension and intended to be made integral in terms of rotation with the blade about the pitch axis of the latter, according to a characteristic particular to the invention the connection of the said member rigid under bending and torsion to the said radial extension is obtained at least partially by means of the corresponding hydraulic device for the individual control of the pitch of a blade, so that the rotor of the rotary jack or rotary jacks of this hydraulic device is integral in terms of rotation about the pitch axis of the blade with the said member rigid under bending and torsion.

Furthermore, when the rotor hub possesses, for connecting each blade to the corresponding radial extension, a combined pitch bearing device with an elastic ball joint and with a hydroelastic shock absorber, in which the shock absorber is rotary and integrated in the elastic ball joint retained between two rigid supports, of which one is intended to be fixed to the corresponding blade and the second is connected to the said extension by means of at least one pitch bearing, so that the combined bearing device allows the angular variation of the pitch of the corresponding blade as a result of the rotation of the ball joint and of the shock absorber about the axis of the pitch bearing or pitch bearings and ensures incorporated damping of the drag oscillations, the rotor hub according to the invention is then advantageously such that the corresponding hydraulic device for the individual control of the pitch is at least partially integrated in the corresponding combined bearing device, so that at least one rotary jack is arranged inside the ball joint and the shock absorber and is stacked axially with at least one pitch bearing, and that the rotor of the rotary jack or rotary jacks is integral with the second rigid support of the ball joint.

In a way known per se, on a rotor hub of this type, the connecting member rigid under tension, but flexible under bending and torsion can be an elongate arm forming a tie substantially radial relative to the axis of the hub and for retaining the corresponding blade counter to the centrifugal force, the inner radial end part of this arm forming the footing part which is retained inside the corresponding radial extension of cylindrical and tubular shape and of an axis substantially perpendicular to the axis of rotation of the hub, whilst the outer radial end part of this arm is fixed, on the one hand, to an intermediate connection piece serving as a fastening for the corresponding blade and, on the other hand, to the outer radial end part of the member rigid under bending and torsion, which is shaped as a rigid cuff which surrounds the elongate arm without contact, up to the vicinity of the central hub body, and of which the inner radial end part bears on the corresponding tubular extension by means of the combined bearing device, about the footing of the elongate arm; in this case, according to the invention, the corresponding hydraulic device for the individual control of the pitch of the corresponding blade is mounted, according to the invention, about the tubular extension by means of at least one cylindrical sleeve which is integral with at least one rotary jack stator of this device and which is fitted onto the tubular extension and immobilized in terms of rotation relative to this extension by means of axial flutes in engagement with matching flutes of the said radial extension of the hub.

In these various embodiments, the central body of the hub is advantageously tubular, in order to accommodate a preferably electrically controlled hydraulic servo-distributor mounted as a reference rotating with the hub and in communication via rigid pipes with each of the inlets and outlets of the rotary jack or rotary jacks of the hydraulic devices for the individual control of the pitch of the blades.

Finally, the subject of the invention is a variable-pitch rotor for rotary-wing aircraft, which can be used particularly as a main helicopter rotor or as a tilting propeller of a convertible aircraft and which comprises a rotor hub driven in rotation about an axis of rotation of the rotor by means of a rotor mast, blades, each of which is retained on the hub by means of at least one connecting member rigid under tension, but flexible under bending and torsion, retaining the blade counter to the centrifugal force and allowing the flapping and drag oscillations of the corresponding blade and the angular variations of its pitch under the effect of a member rigid under bending and torsion which is connected to the blade. According to the invention, such a rotor also possesses, for each blade, a rotary-reference pitch-control system comprising a rotary hydraulic servo-distributor feeding a hydraulic device for the individual control of the pitch of a blade according to the invention and as defined above and mounted in such a way that the stator of the rotary jack or rotary jacks of this hydraulic device is retained on the hub and immobilized on the latter in terms of rotation about the pitch axis of the corresponding blade, whilst the rotor of the rotary jack or rotary jacks is connected in terms of rotation to the member rigid under bending and torsion, about this pitch axis. Furthermore, when the hub of the rotor comprises a central body which is tubular, integral with one end of the likewise tubular rotor mast and coaxial relative to this rotor mast, it is advantageous if, according to the invention, the rotary jacks of all the hydraulic devices for the individual control of the pitch of a blade are connected to the servo valves of the hydraulic distributor accommodated in the central body of the hub and connected to at least one hydraulic power circuit, itself at least partially accommodated in the rotor mast. In the most common and most practical configuration, in which the servo valves are electrically controlled, it is advantageous, furthermore, if the rotor mast also accommodates an electrical collector for the transfer of, on the one hand, control signals to the servo valves and, on the other hand, signals coming from position detectors of the various blades of the rotor.

In general terms, a rotor according to the invention advantageously comprises a rotor hub according to the invention, as defined above, this rotor hub itself being equipped with devices for the individual control of the pitch of a blade, according to the invention and likewise as defined above.

BRIEF DESCRIPTION OF THE DRAWINGS

The invention will be better understood from a reading of the following description of a preferred embodiment and of an alternative version which are described with reference to the accompanying drawings in which.

DESCRIPTION OF PREFERRED EMBODIMENT

Figure 1:
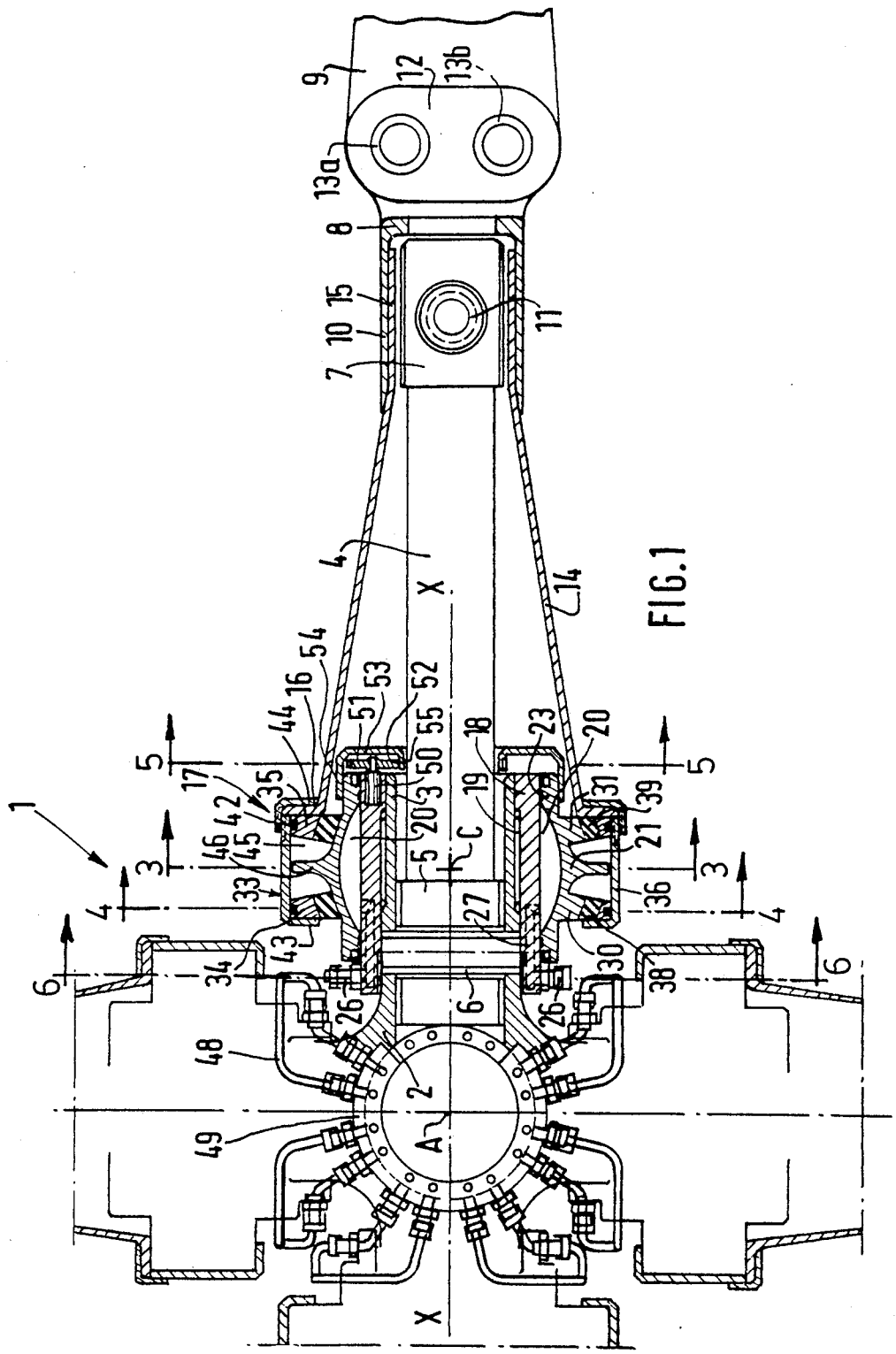
FIG. 1 is a partial schematic view of the hub of a main four-blade helicopter rotor shown partially in plan view and partially in section through a plane perpendicular to the axis of rotation of the rotor and passing through the axis of a radial arm of this rotor hub which is equipped with a hydraulic device for the individual control of the pitch of the corresponding blade.

The main four-blade helicopter rotor illustrated in FIG. 1 has a hub 1 comprising a tubular central body 2 with an axis A coinciding with the axis of rotation of the rotor and also the axis of a tubular rotor mast (not shown), the upper end of which is fixed to the tubular central body 2. The hub 1 also comprises four tubular extensions 3 which are radial relative to the axis A and are each of general cylindrical shape and of which the axes perpendicular to the axis A are uniformly distributed circumferentially about this axis A. These four tubular extensions 3 are integral with the tubular central body 2, with which they form a rigid rotor head driven in rotation by the rotor mast about the axis of rotation A.

For the connection of each of the four blades of the rotor to the hub 1, the latter also comprises an elongate arm 4 forming a radial tie (relative to the axis A), for retaining the blade counter to the centrifugal force to which it is subjected during operation. This elongate arm 4 is a connecting element rigid under tension and flexible under bending and torsion about its longitudinal axis X—X, and it essentially consists, for example, of a longitudinal bundle of metal wires or synthetic or mineral fibers of high mechanical resistance, individually coated with a synthetic resin and bonded together by means of a vulcanized elastomer, as shown schematically in section in FIG. 5, so that this flexible arm 4 transmits, with low axial elongations, centrifugal forces coming from the corresponding blade during operation and by bending allows the flapping and drag movements of the blade and by torsion allows the variations in the trim of the blade.

If appropriate, this longitudinal bundle forming the flexible arm 4 is hollow or tubular and contains an integral shock absorber for the deformations under drag, this integral shock absorber comprising a sealed pocket encasing at least one shear plate for a viscous silicone gel filling the pocket, as described in the applicant's U.S. Pat. No. 4,822,245.

Figure 2:
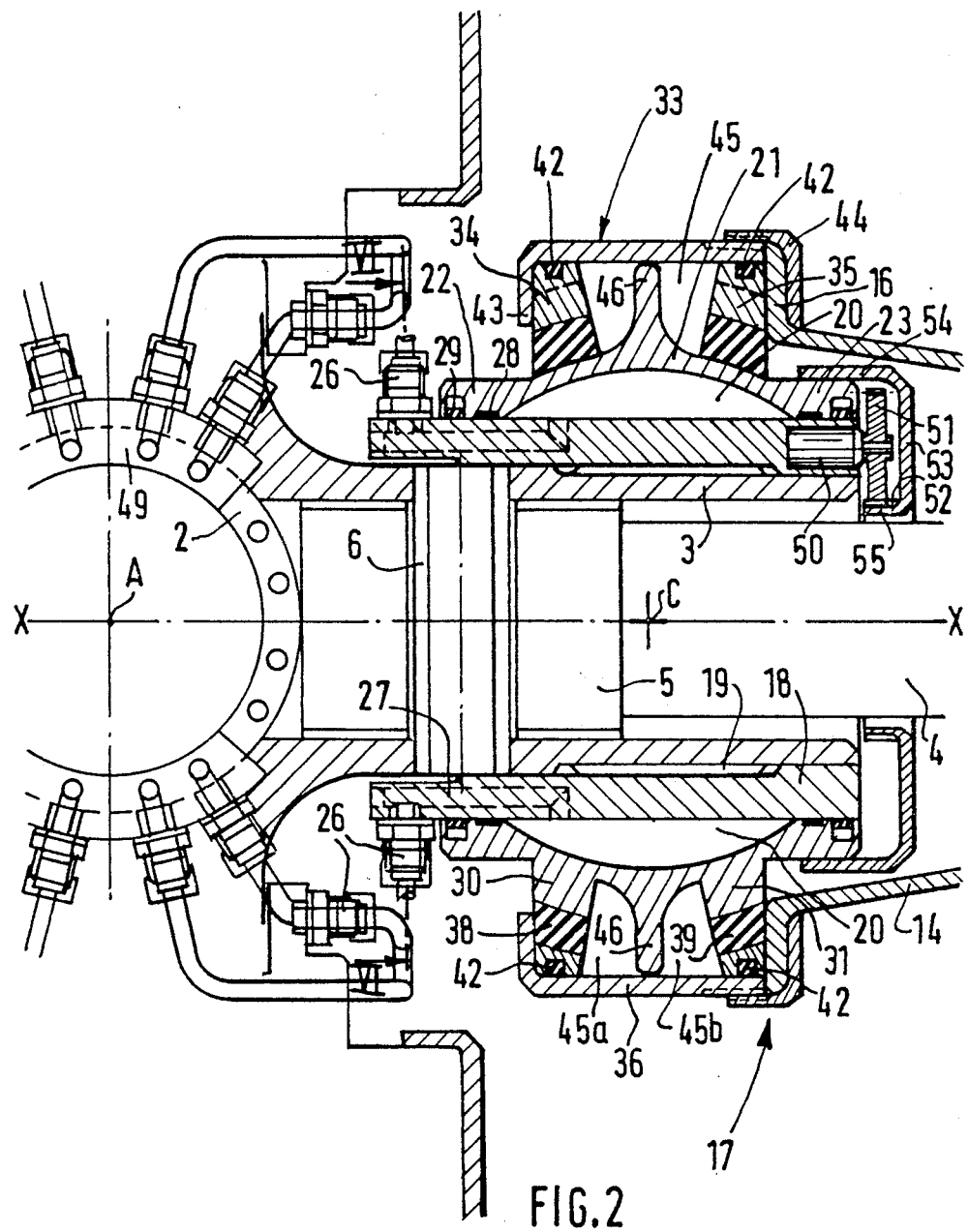
FIG. 2 is a view on a larger scale of part of FIG. 1 which shows the corresponding hydraulic device for the individual pitch control.
Figure 4:
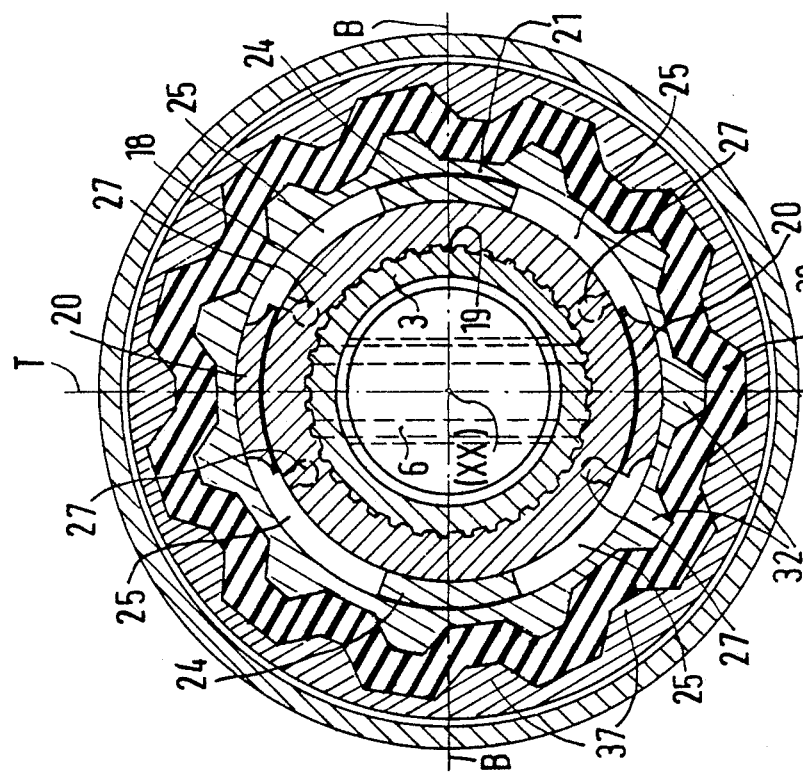
FIGS. 3, 4, 5 and 6 are cross-sectional views of the hydraulic device and the arm of the hub of FIGS. 1 and 2 respectively, along lines III—III, IV—IV, V—V and VI—VI of FIG. 1.

As also shown in FIGS. 2 and 4, the inner radial end of the flexible arm 4 is shaped as a footing part 5 of extra thickness or protected by an axial bush and is fitted and retained in the tubular cylindrical extension 3 of the hub 1, beyond the center C of a hydraulic device for the individual control of the pitch of the blade, described below, and towards the axis A of the hub 1, by means of a cylindrical crosspin 6 having an axis contained in the rotational plane of the rotor and perpendicular to the longitudinal axis X—X of the flexible arm 4 which is thus retained substantially coaxially in the tubular extension 3. This pin 6 is itself tubular and is seated and retained in coincidental cylindrical bores which pass through the footing 5 and diametrically opposite parts of the tubular extension 3.

The outer radial end 7 of the flexible arm 4, which is of cylindrical shape, of extra thickness and, if appropriate protected by an axial bush, is fixed to an intermediate connecting piece 8 serving as a fastening for the root of the corresponding blade 9. This connecting piece 8 is shaped radially inwards (towards the hub body 2) as a cylindrical sleeve 10 which is open towards the hub body 2 and in which the outer end 7 of the flexible arm 4 is engaged and retained by means of a fastening device with a crosspin 11, whose axis is parallel to the axis of rotation A of the rotor, while radially outwards the connecting piece 8 is shaped as a double outer yoke 12 with two branches (only one of which can be seen in FIG. 1) which are parallel and symmetrical relative to the drag plane of the blade 9 and which each have two bores coaxial with the bores of the other branch, in order to receive two pins 13a and 13b for retaining the root of the blade 9, the axes of the two pins 13a and 13b being coplanar, perpendicular to the longitudinal axis X—X of the flexible arm 4 and to the rotational plane of the rotor, and parallel to the axis of rotation A and to that of the pin 11.

In order to connect each blade, such as the blade 9, to the hub 1, the latter also comprises a tubular cuff 14 which surrounds the flexible arm 4 substantially coaxially and without contact, up to the vicinity of the hub body 2. This cuff 14, which is rigid under bending and torsion has an essentially frustoconical shape which converges towards its outer radial end 15 of cylindrical shape, by means of which the cuff 14 is engaged, round the outer end 7 of the flexible arm 4, inside the sleeve 10 of the connecting piece 8 and retained in this sleeve 10 by means of the bush-type fastening device 11, so that the respective outer radial ends 7 and 15 of the arm 4 and of the cuff 14 are fixed to one another.

The cuff 14, via its inner radial end shaped as a radial annular flange 16, bears on the corresponding radial extension 3 of the hub 1 by means of a general device 17 comprising a combined bearing with an elastic ball joint and with an incorporated hydroelastic rotary shock absorber, as well as a double-body double-acting rotary hydraulic jack incorporated in a plain cylindrical bearing for pitch and for fixing to the hub and integrated inside the ball joint which is itself centered on the axis of the cylindrical bearing, the latter being coaxial with to the tubular extension 3 of the hub 1 and with the flexible arm 4 about the longitudinal axis X-X, the axial stack of the trim and fixing bearing and of the rotary hydraulic jack forming the core of a hydraulic device for the individual control of the pitch of the blade 9, which is fed hydraulically by a preferably electrically controlled servo-distributor associated with to each blade and mounted with a rotary reference on the hub 1.

This general device 17, as a whole called a device for the individual control of the pitch of the blade 9, is thus installed substantially within the inner radial end of the rigid cuff 14 which, during operation, is firmly fixed to the blade 9 by means of the connecting piece 8, in order to introduce the pitch control of the blade 9 directly as near as possible to the footing 5 of the corresponding flexible connecting arm 4.

When the rotor rotates, the blades, such as the blade 9, then retained in the operating position by means of the two pins 13a and 13b on the intermediate connecting piece 8, are subjected to flapping and drag movements and to angular variations in the pitch allowed by the flexible arm, such as the arm 4.

In the general device 17, the function of the plain cylindrical pitch pivot bearing is to allow angular variations of the blade about its pitch axis in the extension of the axis X—X of the flexible arm 4, and the function of the rotary hydraulic jack is to control these angular variations. Furthermore, the ball joint of this device 17 has elastomeric elements which give it its elastic character, and its function is, as a result of the deformation under shearing of these elastomeric elements, is to allow a relative freedom of movement or oscillation of the blade under flapping and drag, being rigid relative to the rotations about the pitch axis of the blade 9, so that this ball joint performs a bearing and centering function for the angular movements under flapping and drag, while the essential function of the integrated hydroelastic rotary shock absorber, functioning by the lamination of a hydraulic fluid, such as a high-viscosity silicone gel, by means of vanes, is to damp the angular oscillations of the blade under drag.

Up to this point, the inner or outer axial or radial positions have been identified generally in relation to the axis A of the rotor. For the following description of the assembly 17 consisting of a rotary hydraulic jack integrated in a plain cylindrical bearing for pitch and fixing the hub, combined in an axial stack with a ball joint for elastic return under flapping and drag and with an inner hydroelastic shock absorber for damping the angular drag oscillations of the corresponding blade, the said assembly more particularly forming the subject of the invention, the inner or outer axial or radial positions will generally be indicated below by reference to the longitudinal axis X—X common to the blade 9 in the operating position and to its flexible arm 4. With reference to FIGS. 1 to 6, showing a preferred embodiment the assembly 17 with a spherical bearing damped under drag and incorporating a rotary jack for controlling the pitch of the blade 9 is formed in the following way, starting from inside (towards the axis X—X) and going radially outwards.

In this assembly 17, the rotary hydraulic jack comprises a stator having a cylindrical sleeve 18 which is fitted coaxially onto the cylindrical extension 3 and of which the inner bore has, in its central part, axial flutes 19 projecting radially inwards and in engagement with matching axial flutes projecting radially outwards and located on the outer lateral surface of the extension 3, so that the sleeve 18 of the jack stator is immobilized on the extension 3 against rotation about the axis X—X. However, the sleeve 18 is left free in terms of translational motion in the axial direction (according to X—X) on the extension 3, in order to absorb or compensate small axial movements of the assembly 17 attributable to the elongation of the flexible arm 4 under the effect of centrifugal force. Furthermore, the smooth part of the bore of the sleeve 18 which is axially adjacent to the flutes 19 on the same side as the hub body 2 forms a radial stop keeping the bush 6 in the bores of the extension 3 in the retention position of the flexible arm 4.

The jack stator also comprises two diametrically opposite fixed jack vanes 20 projecting radially outwards from the cylindrical outer lateral surface of the sleeve 18. Each fixed vane 20 has the form of a segment of an imaginary sphere centered at C on the axis X—X, is arranged axially, and has a convex outer radial face, while its inner radial face has the form of a portion of a cylinder, via which the vane 20 is laid against the cylindrical outer lateral face of the sleeve 18, to which it is fixed, for example by electron-beam welding (see FIGS. 1 to 4).

The rotary hydraulic jack also comprises a rotor 21 which forms both on the one hand, the rigid inner radial reinforcement of the viscoelastic ball joint and the stator of the hydroelastic rotary shock absorber, which will be described more fully below. This reinforcement 21 of tubular shape and surrounding the jack stator 18,20 has, in its central part, a spherical inner cavity centered at C, or, more specifically, the inner radial surface of this central part is that of a spherical cap machine-recessed in the reinforcement 21 and opening out axially towards the outside of the reinforcement 21 via bores made in the two cylindrical axial end parts 22 and 23 of this reinforcement 21, so that these two cylindrical parts 22 and 23 each have a smooth axial bearing surface opposite a smooth axial bearing surface on a portion of the outer lateral face of the cylindrical sleeve 18 located axially on one side or the other of the fixed vanes 20. The jack rotor also comprises two diametrically opposite movable vanes 24 (see FIGS. 3 and 4) which are offset at 90° circumferentially about the axis X—X in relation to the fixed vanes 20 of the stator. These movable vanes 24 likewise have the form of segments of the sphere centered at C and arranged axially, but they are fixed, for example again by electron-beam welding, via their convex outer radial face against the concave inner radial face of the spherical cavity of the reinforcement 21 and project radially inwards, so that their inner radial face in the form of a portion of a cylinder is in the immediate vicinity of and opposite the cylindrical outer face of the sleeve 18, between two fixed vanes 20 which themselves have their convex outer radial face in the immediate vicinity of and opposite the spherical inner face of the reinforcement 21.

The spherical inner face of the reinforcement 21 and the two rotor vanes 24 thus delimit, with the cylindrical outer face of the sleeve 18 and the two stator vanes 20, four inner chambers 25 of variable volume, each of which communicates with one of four removable hydraulic connections 26, mounted radially on the outside of the axial end of the sleeve 18 on the same side as the hub body 2 (see FIGS. 1, 2 and 6), via an axial duct 27 having the thickness of the corresponding axial part of the sleeve 18 such that the ends of each duct open out radially, one in the region of the corresponding connection 26 and the other in the corresponding chamber 25, near the stator vane 20 which delimits this particular chamber 25 (see FIG. 4). The four connections 26 associated with a rotary hydraulic jack and thus mounted on the hub 1 are connected to a hydraulic servo-distributor 49 rotating with the hub 2, so as to control the supply or drainage of hydraulic fluid under high pressure (of the order of 20 MPa) of each of the four hydraulic chambers 25. The sealing between these four chambers 25, i.e. between the convex face of the outer radial end of the stator vanes 20 and the spherical concave inner face of the reinforcement 21, and between the cylindrical concave face of the inner radial end of the rotor vanes 24 and the cylindrical convex outer face of the sleeve 18, is ensured as a result of the substantial lamination of the hydraulic fluid between these mutually opposite faces, because of the small radial play between the free ends of the vanes 20 and 24 and the mutually opposite surfaces on the reinforcement 21 and the sleeve 18, and because of a considerable lamination length attributable to the axial dimension of the vanes 20 and 24.

The rotor of the jack or inner reinforcement 21 can pivot about the axis X—X on the cylindrical sleeve 18 of the jack stator by means of two plain bearings arranged axially on either side of the vanes 20 and 24 of the rotary jack and each formed by the two mutually opposite axial bearing surfaces, of which one is the inner bearing surface located on the cylindrical axial end 22 or 23 of the reinforcement 21 and the other is the outer bearing surface on the opposite portion of the cylindrical outer face of the sleeve 18. The sealing between the sleeve 18 and the reinforcement 21 is ensured, in the region of these two plain bearings, by O-ring seals or gaskets 28 and 29, but it is possible to equip each of these two plain bearings with at least one self-lubricating ring associated with a hydraulic device for the automatic take-up of the radial play of the bearing, as described further below with reference to an alternative embodiment.

This results in an axial stack of a rotary hydraulic jack (18-20, 21-24) and of a plain cylindrical bearing (18, 22-23) for pitch and also for fixing to the hub 1, by means of the sleeve 18, the rotary hydraulic jack being integrated in the cylindrical bearing between two axially spaced pairs of mutually opposite axial bearing surfaces interacting with one another.

Alternatively, it is possible to replace the two elementary plain bearings located on either side of the jack vanes 20 and 24 by needle bearings.

To form the elastic ball joint, the inner reinforcement 21 possesses, between its two cylindrical axial end parts 22 and 23 integrated in the cylindrical bearings of the rotary jack, two notched (having notches) or serrated annular rings 30 and 31 projecting radially outwards from the reinforcement 21 and themselves spaced axially from one another. These two serrated rings 30 and 31, symmetrical relative to one another in relation to the mid-plane of the device passing through the center C and perpendicular to the axis X—X, each have over their entire periphery uniform serrations or notches, such as 32 (see FIG. 4), which project radially outwards and the outer radial face of each of which is a convex face of a curvature centered at C, the serrations 32 having substantially the form of small segments of a sphere which between them delimit flutes in the form of portions of a sphere spaced and likewise centered at C.

The elastic ball joint also possesses an outer radial reinforcement designated as a whole by 33 and consisting of two annular rings 34 and 35 connected to one another by means of a peripheral tubular casing 36. The two rings 34 and 35 are spaced axially from one another, so that each is radially opposite and round one of the two rings 30 and 31 of the inner reinforcement 21. Likewise, the two outer rings 34 and 35, which are symmetrical relative to one another in relation to the mid-plane defined above and which have cylindrical outer radial faces, are serrated or notched rings having uniform serrations or notches, such as 37, over their entire inner periphery, which project radially Inwards. These serrations 37 each have an inner radial face which is a concave face of a curvature centered at C and each have substantially the form of a small segment, in the free face of which a small portion of a spherical surface has been machine-recessed, and serrations 37 between them delimit flutes likewise with concave bottoms in the form of portions of an inner spherical surface centered at C (see FIG. 3). Moreover, there is an offset in the circumferential direction about the axis X—X between the serrations 37 of the outer rings 34 and 35 and the serrations 32 of the inner rings 30 and 31, so that each inner serration 32 projects outwards opposite a flute or a recess between two adjacent outer serrations 37 and, conversely, each outer serration 37 projects inwards opposite a flute or a recess between two adjacent inner serrations 32.

To form the elastic ball joint, the outer reinforcement 33 is connected to the inner reinforcement 21 by means of elastomeric elements, and in particular each of the rigid outer rings 34 and 35 is connected to that of the two rigid inner rings 30 and 31 which it surrounds by means of an elastomeric element 38 and 39, likewise in the form of a serrated ring, which fills the space between the mutually opposite walls of the two reinforcement rings thus connected to one another. Each elastomeric ring 38 and 39 is thus connected by adhesive bonding or vulcanization of all the parts of its inner radial wall against the small portions of a spherical surface of the inner serrations 32 and of the bottoms of the flutes between these, and against the lateral faces of the serrations 32 of the corresponding inner reinforcement ring 30 or 31, and likewise each elastomeric ring 38 and 39 is connected in the same way, by means of all the parts of its outer radial wall, against the small concave portions of a spherical surface of the outer serrations 37 and of the bottoms of the flutes between these serrations 37, as well as against the lateral faces of the serrations 37 of the corresponding outer reinforcement ring 34 or 35.

Figure 3:
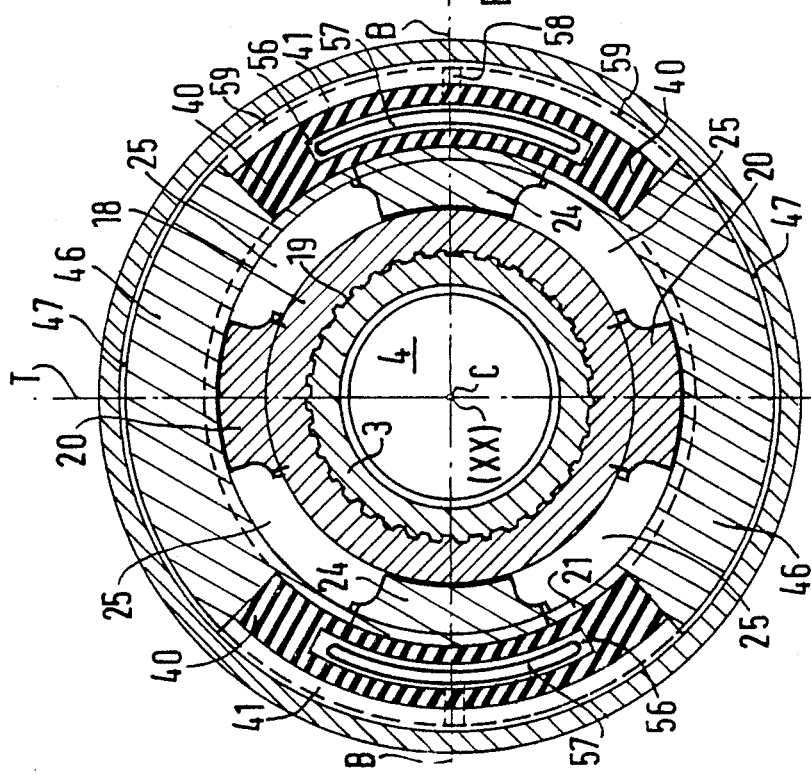

Moreover, the two elastomeric rings 38 and 39 are connected axially to one another by means of two solid elastomer blocks 40 which, as shown in FIG. 3, are diametrically opposite relative to the center C and relative to the axis X—X and have the form of portions of a spherical cap centered at C and adhesively bonded by means of their inner radial concave face to the convex and spherical surface portion delimited, on the outer radial face of the reinforcement 21, between the serrated rings 30 and 31 of this reinforcement 21. Each of these solid blocks 40, which is in one piece with the elastomeric rings 38 and 39, extends circumferentially about the axis X—X over an angular sector of approximately 90° and symmetrically on either side of the flapping plane B-B (see FIG. 3) of the corresponding blade and on either side of the radial mid-plane passing through the center of curvature C.

In the radial recess delimited between the two serrated rings 30 and 31 of the inner reinforcement 21, between the two elastomeric rings 38 and 39 and between the two serrated rings 34 and 35 of the outer reinforcement 33, each of the two solid blocks 40 extends radially as far as a portion 41 of extra thickness radially inwards and oppositely on the peripheral or outer casing 36 which is mounted removably and sealingly by means of O-ring gaskets 42 about the outer rings 34 and 35 which this casing 36 connects axially to one another, the casing 36 also having an inner radial collar 43, by which it comes up against the inner axial face of the outer ring 34 nearest to the hub body 2 (see FIGS. 1 and 2). The casing 36, together with the outer reinforcement 35, is fixed to the rigid cuff 14 by means of a radial shouldered fastening and centering strap 44 which is screwed to the end of this casing 36 and which keeps the outer ring 35 in the outer axial position against the radial flange 16 at the inner axial end of the cuff 14, this radial flange 16 being clamped between the ring 35 and the radial shouldered strap 44, of which the axial shoulder screwed to the casing 36 keeps it in a position of sealing interaction against the outer ring 35.

In the ball joint completed in this way, the elastomeric rings 38 and 39 and the two elastomer blocks 40, as a result of the shearing of the elastomer of which they are made, allow the oscillatory movements of the blade 9 under flapping and drag. These oscillatory movements are transmitted by the rigid cuff 14 to the outer reinforcement 33 which thus pivots about the inner reinforcement 21 under flapping (perpendicularly to the plane of FIG. 1) and under drag (in the plane of FIG. 1).

At this juncture of the description, the assembly 17 is therefore an integral assembly comprising a dry cylindrical bearing, a rotary hydraulic jack and an elastic ball joint, the cylindrical bearing forming the pitch joint fixed to the tubular extension of the hub 1 and free in terms of translational motion with sufficient axial play to allow the axial movements of the ball joint and the jack which are necessary because of the centrifugal force exerted on the assembly during operation and because of the assembly tolerances, the rotary hydraulic jack controlling the rotation of the blade 9 and of its cuff 14 about its pitch axis X—X, and the ball joint allowing the oscillatory movements of the blade and of the cuff 14 under drag and flapping.

Furthermore, the assembly 17 possesses a rotary hydraulic shock absorber for damping these drag movements.

For that purpose, each of the two receptacles 45 extending substantially the outer reinforcement 33 radially and circumferentially between the two elastomer blocks 40, that is to say each of the two receptacles 45 symmetrical relative to one another in relation to the center C, the axis X—X and to the flapping axis B-B and occupying alternating positions in a circumferential direction with the elastomer blocks 40, is a receptacle 45 filled with hydraulic fluid laminated by means of a shock-absorber vane 46. Each of the two receptacles 45 extends symmetrical on either side of the drag plane passing through the axis T—T of the blade 9 and is delimited circumferentially by the two blocks 40, laterally between the mutually opposite notched faces of the two inner rings 30 and 31, of the two elastomeric rings 38 and 39 and of the two outer rings 34 and 35, radially outwards by the cylindrical face of the casing 36 and radially inwards by that portion of the convex outer radial face of the inner reinforcement 21 which is limited between the two inner rings 30 and 31 and which has, projecting radially outwards, the two lamination vanes 46, each of which is received in one of the receptacles 45. Each of the rigid vanes 46 is integral by means of its root with the outer face of the inner reinforcement 21, to which it is attached and fastened unremovably, for example by electron-beam welding, or with which it is machined in one piece. The dimensions of the vanes 46 are such that their free end (in the outer radial position) is separated only by a small calibrated radial gap 47 from the cylindrical inner surface of the casing 36 which sealingly closes the receptacles 45 radially outwards, while the sealed closure of these receptacles 45 in the lateral direction is ensured, between the two reinforcements 21 and 33, by the serrated elastomeric rings 38 and 39 which allow the relative rotations of the reinforcements 21 and 33 about the center C under flapping and under drag.

Each of the two receptacles 45 is in communication with the outside of the device 17 via two lateral bores (not shown) which are made in the axial direction and one of which passes through the upper part of the outer ring 35, by means of which the outer reinforcement 33 is fastened to the cuff 14, and is connected to a hydraulic filling valve (not shown) mounted on this ring 35 and accessible from outside, while the other bore passes through the lower part of the outer ring 34 nearest to the hub body 2 and is connected to a bleed valve (not shown) likewise accessible from outside.

Thus, by means of the filling valve, it is possible to fill with a high-viscosity silicone oil or gel the receptacles 45 which each delimit an inner chamber of a rotary hydraulic shock absorber, the stator of which is formed by the inner reinforcement 21 of the viscoelastic ball joint, also forming the rotor of the rotary hydraulic jack, this shock-absorber stator 21 carrying the two lamination vanes 46 which are each engaged in an inner shock-absorber chamber 45 partially delimited in the shock-absorber rotor which consists of the outer reinforcement 33 of the elastic ball joint and which is connected to the blade 9 by means of the cuff 14. Each vane 46 subdivides the inner shock-absorber chamber 45 receiving it into two damping chambers 45a and 45b, of which one decreases in volume and is put under compression and the other increases in volume and is put under expansion when the shock-absorber rotor 33 pivots relative to the shock-absorber stator 21, in rotation about the center C of the ball joint, as a result of the shearing of the elastomer of the rings 38 and 39 and of the blocks 40 because of an angular movement of the blade 9 under drag in the drag plane T—T of FIG. 3 which is the plane of FIGS. 1 and 2.

These correlative increases and decreases of the volumes of the chambers 45a and 45b cause the forced passages of the silicone oil or gel from the compressed chamber of decreasing volume towards the expanded chamber of increasing volume, via the small lamination passage 47 delimited between the free end of each vane 46 and the opposite cylindrical surface portion on the inner face of the outer casing 36.

The lamination of the oil or gel between the vanes 46 and the casing 36 ensures a damping of the rotational movement, and in order to damp the angular oscillation under drag the vanes 46 are the most effective when they are symmetrical relative to one another in relation to the flapping plane B—B and perpendicular to the longitudinal axis X—X of the flexible arm 4 and of the corresponding blade 9.

At this juncture of the description, the assembly 17 comprises a rotary hydroelastic shock absorber integrated in the elastic ball joint which is itself combined with the rotary hydraulic jack which it surrounds and which is, in turn, integrated in a cylindrical pitch bearing.

The sealing of the chambers 45 of the hydraulic shock absorber, the rotor and stator of which are formed respectively by the outer reinforcement 33 and the inner reinforcement 21 of the ball joint, is ensured by the elastomeric elements 38, 39 and 40 which, in this ball joint, allow oscillations under flapping and under drag.

These elastomeric elements 38, 39 and 40 ensure the centering of the shock-absorber rotor 33 relative to the shock-absorber stator 21, at the same time as the shock-absorber vanes 46 ensure damping under drag as a result of the lamination of the silicone oil or gel, during the angular movements under drag from the initial radial position of the blade 9 in operation, just as during the the elastic returns towards this initial position.

But in addition, because of the notched or serrated structure of the elastomeric rings 38 and 39 retained between the serrations and flutes 32 and 37 in the form of portions of a sphere of the inner and outer rigid rings 30, 31 and 34, 35 respectively of the inner reinforcement of the ball joint or jack rotor 21 and of the outer reinforcement of the ball joint or shock-absorber rotor 33, the transmission of the torque for controlling the pitch of the blade between the rotor 21 of the rotary jack and the rotor 33 of the shock absorber, fixed to the cuff 14 for connection to the blade 9, is obtained via the elastomer with a very high rotational rigidity about the axis X-X necessary for controlling the variation of the pitch of the blade 9 from the rotary hydraulic jack (18–20, 21–24).

As a result of this, the supply of hydraulic fluid under pressure to two diametrically opposite jack chambers 25 by means of the servo-distributor via the corresponding connections 26, the said connections 26 in communication with the other two opposite chambers 25 of the jack allowing the drainage of these two other chambers 25, causes an increase in the volume of the two chambers 25 supplied and, correlatively, a decrease in the volume of the other two chambers 25, thus giving rise to the rotation of the two rotor vanes 24 and of the rotor 21 of the jack, to which they are fixed, about the cylindrical sleeve 18 of the jack stator. This rotation of the rotor/inner reinforcement of the ball joint is transmitted, by means of the serrated elastomeric rings 39 and 38 made rigid in the circumferential direction, to the outer reinforcement 33, itself integral with the cuff 14 and the blade 9 in terms of rotation about the axis X—X, so that the angular pitch position of the blade is changed.

Each of the sixteen connections 26 (four connections for the rotary hydraulic jack of each of the four blades of the rotor) is connected by means of a rigid pipeline, such as 48 in FIG. 1, to a hydraulic servo-distributor which is mounted as a rotary reference on the central body 2 of the hub 1 within this tubular central body 2 and of which only the base 49 is shown. The hydraulic servo-distributor is itself fed, at a pressure of approximately 20 MPa, by one of the hydraulic power circuits of the helicopter, by means of a hydraulic selector (not shown) mounted in the tubular rotor mast.

However, it is also possible to ensure the hydraulic supply of the servo-distributor by means of two independent hydraulic circuits. In addition to the conventional components of the hydraulic circuits, such as the reservoirs or tanks, accumulators, relief valves and, if appropriate, coolers or radiators, these independent circuits, which are accommodated more or less completely in the tubular rotor mast, can have two hydraulic pumps which are mounted in the rotor mast and of which one of the two elements in relative rotation which are the rotor and stator of each pump is connected to the rotor mast and driven in rotation together with this, while the other element is connected to the structure of the helicopter.

The servo-distributor is equipped with servovalves having a hydraulic power stage and an electrical control stage and being of any known suitable type. These servo valves are controlled by electrical signals prepared in an electronic circuit for processing control commands, which originate as a result of the actuation by the pilot of at least one control member, such as a lever or control stick, and information relating to the position of the blades and coming from position detectors.

In a conventional way, this electronic processing circuit comprises a control center which receives the electrical pilot control commands and the electrical output signals from the position detectors and which prepares the electrical signals for controlling the servo valves which are transmitted to these. This electronic circuit also possesses an electrical collector (not shown) mounted in the rotor mast, in order to ensure the transfer, on the one hand, of the electrical output signals from the position detectors associated with the blades to the control center and, on the other hand, of the electrical servo-valve control signals coming from the control center and transmitted to the servo valves mounted as a rotary reference on the hydraulic servo-distributor.

It should be noted that the hydraulic distribution servo valves can be installed as near as possible to each rotary hydraulic jack (for example, at the location of the connections 26 at the end of the sleeves 18), this being advantageous for improving the response of each rotary hydraulic jack for controlling the pitch of a blade to the high-frequency control commands, as occurs within the framework of a multicyclic control for active vibration control.

Figure 5:
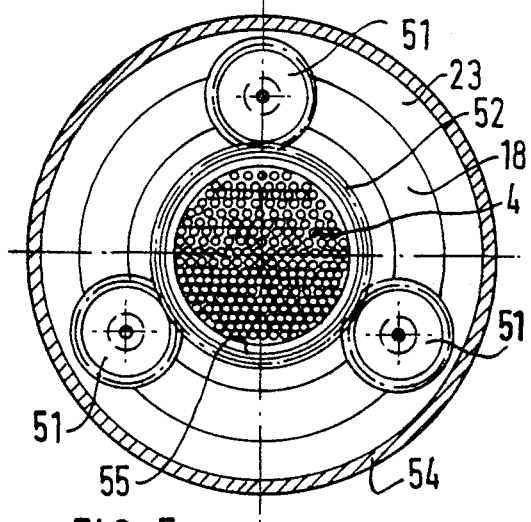
Figure 6:
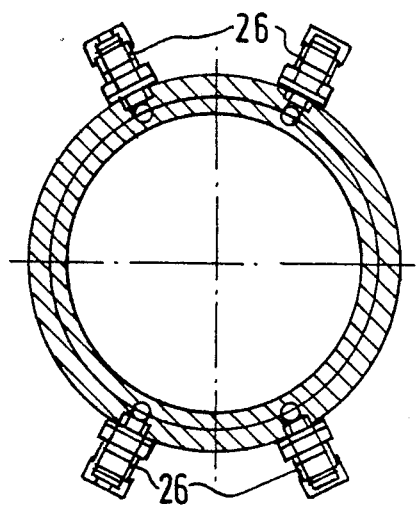

In order to ensure the necessary redundancy in the detection of the angular position of each blade about its pitch axis X—X, the rotary double-body electrohydraulic servo-control combined with each blade 9 and comprising a rotary hydraulic jack, the four servo valves associated with it in the hydraulic servo-distributor and the four hydraulic pipelines 48 connecting the base 49 of the distributor to the connections 26 possesses, in addition, a set of three position detectors or sensors for each blade. In this example, each position sensor 50, installed in an axial recess made in the thickness of the axial end part of the cylindrical sleeve 18 facing the blade 9, is a sensor of the rotary induction type. This sensor 50 can be a rotational position transducer, such as those marketed under the brand name of "FARRAND INDUCTOSYN" by Messrs. INDUCTOSYN INTERNATIONAL CORPORATION for the accurate measurement of angular movements and utilizing a well-known principle of measurement by capacitive or inductive coupling between conductive networks connected to two rigid substrates which are without any contact with one another and of which one rotates relative to the other. In each position sensor 50, one of the two substrates is a peripheral member fastened in the receptacle of the cylindrical sleeve 18 of the stator of the jack, while the other substrate is a rotary central member which rotates in the peripheral member about an axis parallel to the axis X—X of the rotary jack. This central member of the sensor 50 is integral in terms of rotation about its axis with a pinion 51 projecting on the outside of the sleeve 18 on the same side as the blade 9. The three sensors 50 occupy positions uniformly distributed circumferentially about the axis X—X, as shown in FIG. 5, and each of the three pinions 51 is in engagement with the external radial toothing 52 of a single annular toothed ring 53 integral in terms of rotation with the rotor 21 of the corresponding rotary hydraulic jack. The ring 53 has the form of an annulus of a cross-section in the form of a U laid horizontally, of which the base constitutes a radial bracket and of which one lateral wing longer than the other and in the outer radial position extends axially as a skirt 54 round the cylindrical end part 23 of the sleeve 18, to which it is fastened, while the other wing in the inner radial position forms a small skirt 55 surrounding the corresponding flexible arm 4 with radial play and carrying the toothing 52 of the ring 53. The latter thus at the same time constitutes a cover for protecting not only the three pinions 51 accommodated between the skirts 54 and 55 and the radial bracket of the ring 53 but also the outer axial end of the rotary hydraulic jack and the cylindrical bearing for pitch and fixing to the hub.

Thus, the rotation of the rotor 21 about the stator 18 of the rotary hydraulic jack is transmitted to the ring 53 which itself drives in rotation each of the three pinions 51, together with the movable member of the corresponding sensor 50, and the electrical output signals from the three sensors 50 are transmitted to the control center which computes the average of these in order to obtain a signal representing the exact angular position of the corresponding blade 9 about its pitch axis X—X.

In the assembly 17 described above, in order to improve the functioning of the integrated rotary hydroelastic shock absorber with vanes 46 for laminating the silicone oil or gel passing from one of the two chambers 45a and 45b of each receptacle 45 to the other, during the angular oscillations of the corresponding blade 9 under drag, it is expedient to provide means for compensating the variations in volume of the oil or gel of the shock absorber which can possibly arise as a result of differences between the variations in volume of the compressed and expanded damping chambers 45a and 45b and, above all, the thermal expansions of this oil or of this gel. For that purpose, two receptacles 56 symmetrical relative to one another in relation to the axis X—X are each made in one of the two elastomer blocks 40 and extend circumferentially symmetrically on either side of the flapping plane B—B and in alternation with the receptacles 45 of the vanes 46, from which they remain separated by solid elastomeric parts of the blocks 40. In the axial direction, these receptacles 56 extend between the outer rigid rings 34 and 35 of the outer reinforcement 33, and the sealing of these receptacles 56 is likewise ensured by the elastomer of the rings 38 and 39 and of the blocks 40. A sealed inflatable rubber bladder 57 is arranged in each receptacle 56 and is equipped with a small inflation tube (not shown) passing through a lateral bore made axially in the outer ring 35, by means of which the outer reinforcement 33 is connected to the rigid cuff 14, and this small inflation tube is connected to a pneumatic inflation valve (also not shown) mounted at the exit of the bore and accessible from outside the device 17 on the same side as the cuff 14.

Furthermore, each receptacle 56 is connected to each of the two receptacles 45 (receiving the vanes 46) via a calibrated passage comprising a small radial duct 58 centered on the flapping axis B—B and extending radially towards the outside of the receptacle 56, through the part of extra thickness 41 of the outer reinforcement 33, as far as the inner cylindrical face of the outer casing 36, and a bent duct 59 into which opens the radial duct 58 and which connects the two receptacles 45 to one another and is delimited circumferentially by a calibrated radial play between the casing 36 and the part of extra thickness 41 of the outer reinforcement 33 (see FIG. 3).

This produces, in each receptacle 56 and round the inflatable sealed bladder 57 which the latter contains, a hydraulic chamber which is filled with silicone oil or gel via the calibrated ducts 58 and 59 during the filling of the receptacles 45 by means of the associated hydraulic filling valves.

By means of the pneumatic inflation valves associated with the sealed inflatable bladders 57, the latter are inflated, the effect of this being to ensure a static pressurization of the rotary hydroelastic shock absorber with vanes 46, through which the pressurized hydraulic chambers in the receptacles 56 form compensation chambers, in which the variations in volume of the oil or gel are compensated as a result of the compression of the inflated bladders 57.

Moreover, the ducts 58 and 59 for communication between the compensation chambers 57 and the damping chambers 45a and 45b in the receptacles 45 are calibrated so as to form a dynamic filter for the operating frequencies of the rotary hydraulic shock absorber.

In addition, in order to improve the rotation of the rotor 21 of the hydraulic jack about the cylindrical sleeve 18 of the stator of this jack in the region of the cylindrical pitch and fixing pivot bearing formed by the cylindrical axial end parts 22 and 23 of the rotor 21 and by the opposite portions of the sleeve 18, for the purpose of reducing the amplitude of the control forces necessary for varying the pitch of the blade 9, the gasket mounted at 29 in each of the cylindrical axial end bearing surfaces of the sleeve 18 and axially on the outside, relative to the vanes 20 and 24 of the jack, of the O-ring gasket 28 mounted in the same cylindrical bearing surface is replaced by a self-lubricating ring retained in an annular groove made in the corresponding cylindrical bearing surface.

Thus, the combined assembly 17 making it possible to support the inner axial end of the cuff 14 on the hub 1 comprises, on the one hand, an axial stack of a cylindrical pitch joint and of a rotary hydraulic rotor with vanes, integrated in the pitch joint taking the form of a plain pitch bearing comprising two self-lubricating rings spaced axially on either side of the vanes of the jack and each retained in its groove in such a way as to be mounted in the rotor of the jack so as to rotate on and about the cylindrical sleeve 18 of the jack stator, the said sleeve 18 being fixed and immobilized in terms of rotation on the tubular extension 2 of the hub 1, and, on the other hand, in radial series and concentrically, a flapping and drag ball joint which has elastic elements and in which is integrated a rotary hydroelastic shock absorber with vanes for the lamination of a hydraulic fluid.

When a combined assembly 17, such as that described above, comprises both a shock absorber with at least one hydraulic chamber for compensating the variations in volume of the hydraulic fluid of the damping chambers and a cylindrical pitch and fixing bearing with two self-lubricating rings retained in annular grooves spaced axially in bearing surfaces located on one side and the other of the rotary hydraulic jack, it is advantageous if each self-lubricating ring consists of two substantially complementary half-rings of semi-cylindrical shape which are seated in one and the same retaining groove and which are stressed radially inwards against the cylindrical sleeve 18 by means of a hydraulic device for the automatic take-up of the radial play of the bearing. In this case, each self-lubricating ring is connected sealingly to each of the two lateral faces of the retaining groove, in which it is seated, by means of a flexible and elastically deformable annular seal. This seal has, for example, a U-shaped cross-section which is seated in the corresponding retaining groove and the wings of which are fixed to the lateral faces of this groove, while the base of the U-shaped seal between the ring and the bottom of the groove is not fixed to this bottom, into which opens a conduit for communication with a pressurized hydraulic chamber of the play take-up device, this pressurized hydraulic chamber being a hydraulic compensation chamber of the rotary shock absorber. To ensure the sealing of the hydraulic play take-up device in the region of the two rings, each half-ring is connected at its two ends to the two ends of the other corresponding half-ring by means of two flexible and elastically deformable connections, each of which is fixed to the U-shaped seal, the two wings of which it connects to one another. Moreover, these seals and flexible connections are elements made of an elastic material, such as an elastomer, and to produce them it is possible to use the same elastomer as that of the elastic element or elastic elements of the ball joint and of the hydraulic shock absorber.

Figure 7:
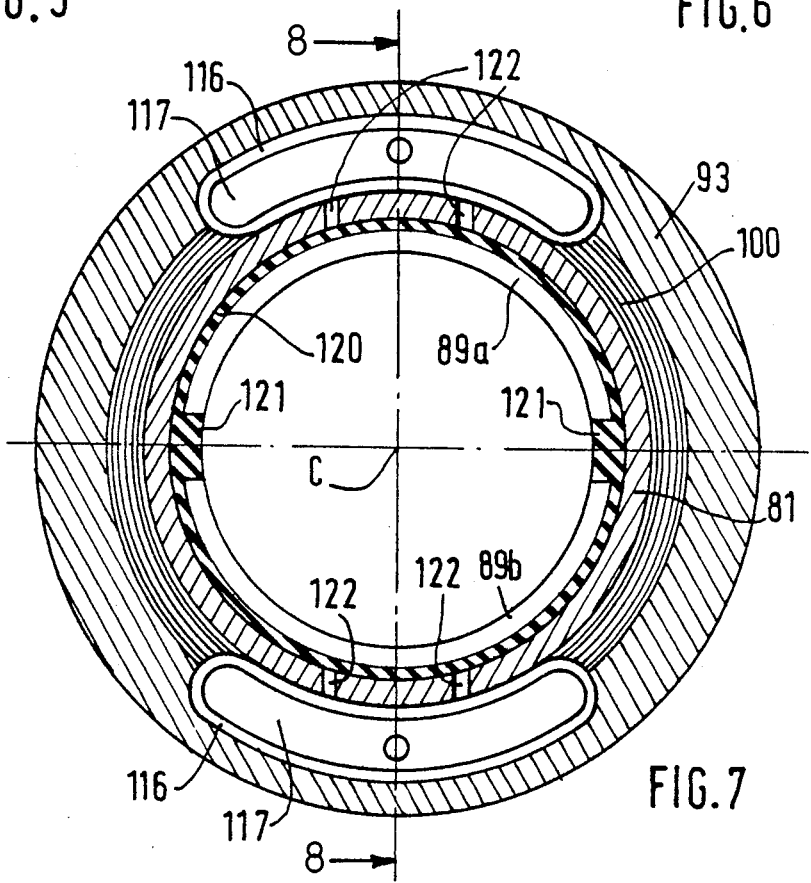
FIG. 7 is a schematic cross-sectional view along line VII—VII of FIG. 8, relating to a hydraulic device for automatic play take-up which equips an alternative version of the hydraulic device for the individual control of the pitch of the blade, as shown in FIGS. 1 to 6.
Figure 8:
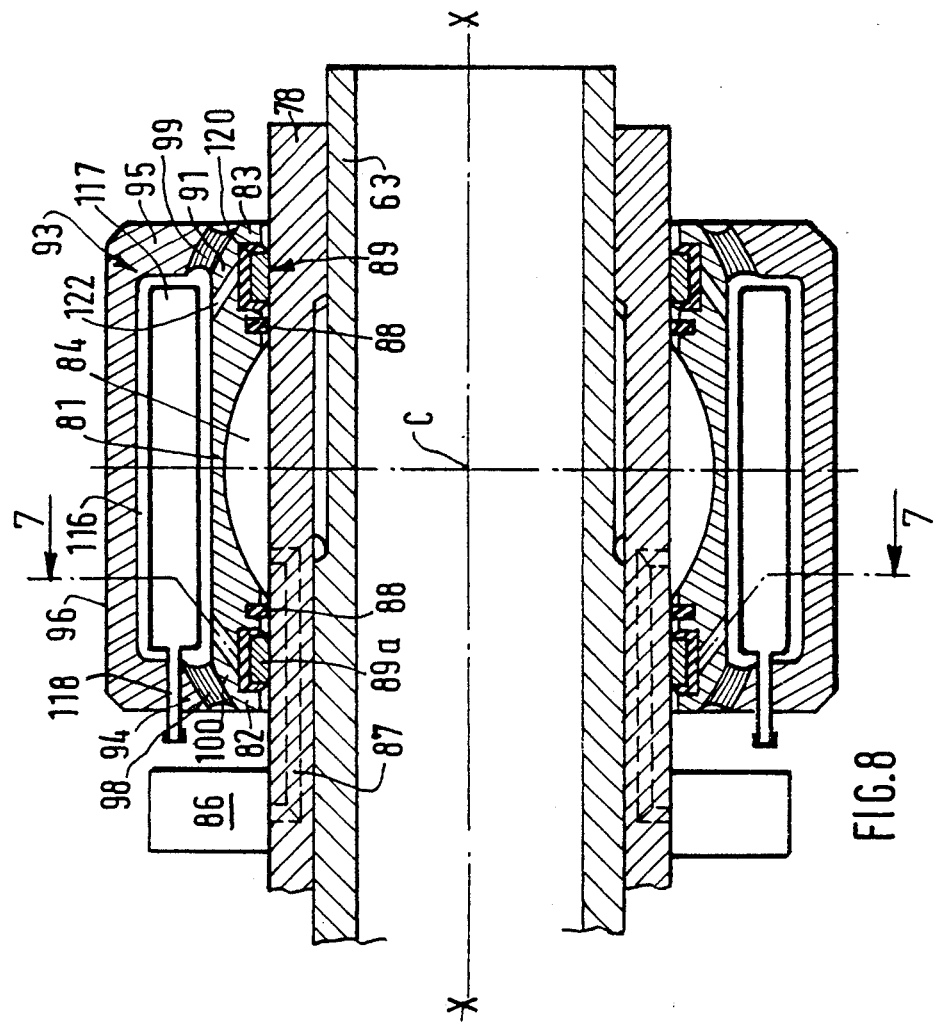
FIG. 8 is a schematic sectional view along line VIII—VIII of FIG. 7.
Figure 9:
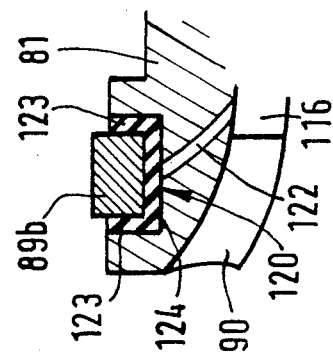
FIG. 9 is a partial schematic view showing a detail of FIG. 8.

Such an embodiment is shown diagrammatically in FIGS. 7 to 9 which will now be described and which illustrate the outer and inner reinforcements 93 and 81 of an elastic ball joint, the outer reinforcement 93 of which comprises two rigid radial rings 94 and 95 serrated in the circumferential direction and an outer casing 96 connecting them axially, and the inner reinforcement 81 of which comprises two cylindrical axial end parts 82 and 83 and two rigid radial rings 90 and 91 likewise serrated in the circumferential direction and connected to the rings 94 and 95 of the outer reinforcement 93 by means of two serrated viscoelastic elastomeric rings 98 and 99, the outer and inner reinforcements 93 and 81 at the same time forming respectively the rotor and stator of a rotary hydroelastic shock absorber comprising two inner shock-absorber chambers (not shown), each accommodating a lamination vane (likewise not shown) in one piece with the shock-absorber stator or inner reinforcement 81, and two hydraulic compensation chambers 116, each accommodating a sealed bladder 117 made of an elastically deformable material and inflatable by means of an inflation tube 118 connected to an inflation valve (not shown), the sealing of the shock-absorber and compensation chambers connected to one another via calibrated ducts, as in the preceding example, being ensured by the elastomeric rings 98 and 99 and by elastomer blocks 100 connecting these rings to one another between the hydraulic chambers of the shock absorber. It can also be seen that the inner reinforcement/shock-absorber stator 81 at the same time form the rotor of a rotary hydraulic jack which comprises rotor vanes 84 integral with the rotor 81 and stator vanes alternating circumferentially with the vanes 84 of the rotor and integral with a cylindrical sleeve 78, on which the jack rotor 81-84 is mounted rotatably about the pitch axis X—X of the corresponding blade. It can be seen, further, that the inner chambers of the rotary jack which are delimited between the vanes of the rotor and of the stator are fed by means of electrohydraulic servo valves 86 mounted on an axial end of the sleeve 78 and connected to these chambers via axial ducts 87 made in the thickness of the sleeve 78 fixed round the tubular radial extension 63 of a hub, on which this sleeve is immobilized in terms of rotation about the axis X—X by inner flutes in engagement with outer flutes of the extension 63, O-ring gaskets 88 also being seated in grooves made in the cylindrical bearing surfaces of the axial ends 82 and 83 of the rotor 81, in order to ensure the axial sealing of the rotary hydraulic jack.

In contrast, the main difference between this embodiment and the example described with reference to the preceding Figures is that, axially on either side of the vanes 84 of the rotary hydraulic jack and of the gaskets 88, the cylindrical pitch and fixing bearing formed by the cylindrical sleeve 78 and by the cylindrical end parts 82 and 83 of the rotor 81 also possesses a self-lubricating ring 89 in two substantially semi-cylindrical parts or half-rings 89a and 89b which are seated in one and the same annular retaining groove 120 made in the inner cylindrical bearing surface of the corresponding end part 82 or 83 of the jack rotor 81, the two half-rings 89a and 89b of each ring 89 being engaged in a single annular elastic seal 120 injected in the same elastomer as that of the rings 98 and 99 and of U-shaped cross-section. The two lateral wings 123 of the U-shaped seal 120 are adhesively bonded internally to the lateral faces of the half-rings 89a and 89b and externally to the lateral walls of the corresponding groove, while the rear or outer radial face of the base 124 of the U-shaped seal 120 is not adhesively bonded against the bottom of the corresponding groove, into which open narrow conduits 122 which are made in the inner reinforcement 81 and which put each hydraulic compensation chamber 116 in communication with the annular volume delimited in each groove between the bottom of the latter and the base 124 of the U-shaped seal 120. The two wings 123 of this seal 120 are connected to one another by means of connections 121 filling the circumferential clearance between the mutually opposite ends of the two half-rings 89a and 89b of each ring 89, and the two connections 121 are made of elastomer and are in one piece with the seal 120. The rings 89 are made of a material suitable for forming a dry self-lubricating bearing, for example a composite material with carbon fibers randomly dispersed in a polyimide resin.

This produces a cylindrical pitch bearing with two self-lubricating rings 89, interacting with a hydraulic device for the automatic take-up of the radial play of the bearing, in which the hydraulic compensation chambers 116 of the rotary shock absorber at the same time perform the function of the hydraulic compensation chamber of the hydraulic play take-up device which is intended for compensating the frictional wear of the rings 89 of the bearing, to avoid reducing the efficiency of the latter. The take-up of play is obtained hydraulically by putting each compensation chamber 116 in communication via the narrow conduits 122 with the sealed annular chamber between the base of the seal 120 retained in each groove and the bottom of this groove, so that the elastic seals 120 ensure not only the suspension and retention of the half-rings 89a and 89b on the inner reinforcement 81, but also the sealing of the hydraulic device for the automatic take-up of play and allow a degree of radial freedom of the half-rings, the annular play of which they also delimit.

The take-up of play during static functioning occurs as a result of the diametral or radial displacement of the half-rings 89a and 89b against the sleeve 78 of the dry pitch bearing under the action of the static pressure of the silicone oil or gel of the shock absorber, this pressure being determined by the inflation pressure of the pneumatic bladders 117. During dynamic functioning, the pitch bearing is blocked without any radial play, because the narrow conduits 122 are calibrated in such a way as also to form a dynamic filter for the operating frequencies of the shock absorber.

As in the preceding example, the inner reinforcement/jack rotor 81, with its two self-lubricating rings 89, as well as the integral elastic ball joint and rotary hydroelastic shock absorber which surround it and are concentric with it can move axially in translational motion along the cylindrical sleeve 78 of the plain pitch bearing over a short travel which makes it possible to compensate the effects of the centrifugal force and which is limited towards the outside by the presence of the corresponding rigid cuff and towards the inside by the shoulder limiting the end of the flutes in the sleeve 78.

In the example described with reference to FIGS. 1 to 6, the flexible arm 4 and the rigid cuff 14 which are associated with one and the same blade 9 are considered as constituting elements of the hub 1 which are coupled to the blade 9 by means of a removable connection.

However, it is also possible for only the flexible arm 4 to belong to the hub and to be coupled to the spar of the blade by means of a removable connection, while the corresponding rigid cuff 14 is in one piece with the profiled shell of the blade and in the extension of this shell, the rigid cuff then being an element of the blade. It is possible, further, for the flexible arm 4 to be in one piece with the spar of the blade and in the extension of this spar and thus to form an element of the blade, while the rigid cuff is an element of the hub which is connected to the profiled shell of the blade by means of a removable connection, or for the flexible arm and the cuff both to be elements of the blade which are connected respectively to the spar and to the profiled shell of this blade, and not elements of the hub.

The reference symbols inserted after the technical characteristics mentioned in the claims have the sole purpose of making it easier to understand these and in no way limit their scope.

What is claimed is:

1. A hydraulic device for individual control of the pitch of a blade of an aerodyne rotor, said device comprising
   (a) at least one double-acting rotary hydraulic jack (18–20, 21–24) adapted to be mounted on said rotor and to be driven in rotation with said rotor, said at least one jack having an axis of rotation coinciding with a longitudinal pitch-changing axis of said blade;
   (b) at least one servo-distributor rotating with said rotor and controlling a supply of pressurized hydraulic fluid to said at least one jack, said servo-distributor connecting said jack to at least one hydraulic power circuit and being adapted to receive control signals indicating a state of at least one blade emanating from at least one detector means;
   (c) said jack comprising a substantially tubular stator fixed to a central part of a hub of a head of said rotor and a substantially tubular rotor coaxial with said stator and being rotatably connected to said blade and comprising at least one inner chamber of variable volume delimited at least partially between said rotor and said stator and connected to at least one said servo-distributor;
   (d) said stator and said rotor being coaxial about said pitch axis of said blade and having opposing lateral surfaces of revolution about their common axis, a first one of said lateral surfaces being a cylindrical surface of circular cross-section, and a second one of said lateral surfaces having the form of a spherical cap, at least one jack vane diametrically opposed relative to said common axis projecting from each of said lateral surfaces and extending to the immediate vicinity of the respective opposite lateral surface, each of said at least one jack having a convex shape facing toward said opposite lateral surface, said at least one jack vane projecting from said second lateral surface having the shape of a spherical segment connected by a convex face thereof to said spherical cap and having a face in the shape of a portion of a circular cylinder opposite said cylindrical surface, said at least one jack vane projecting from one of said lateral surfaces being circumferentially offset about said pitch axis relative to said at least one jack vane projecting from said opposite lateral surface, so as to delimit at least two chambers of variable volume with a small leakage flow from one said chamber to the other via a small radial play between said jack vanes and said opposite surfaces of revolution;
   (e) there being at least one axial stack, substantially concentric with said pitch axis, of at least one said rotary hydraulic jack and of at least one cylindrical pivot bearing for the pitch of said blade and for attachment on said hub enabling said blade to rotate about said pitch axis relative to said hub, said rotor of at least one jack being mounted for rotation relative to a corresponding stator by means of at least one said cylindrical pivot bearing, said bearing comprising two axially spaced pairs of facing cylindrical bearing surfaces, a rotor and a stator of at least one rotary hydraulic jack being integrated between said pairs of bearing surfaces; and (f) a ball joint centered substantially on said pitch axis comprising at least one element of elastic material which element is at least partly in the form of at least a portion of at least one spherical cap retained between two rigid supports, one of said supports being integral with said blade in terms of torsion about said pitch axis of said blade, the other of said supports being integral in terms of rotation with the rotor of at least one said rotary hydraulic jack about said pitch axis, said ball joint being rigid circumferentially about said pitch axis while permitting, about a center of said ball joint, relative freedom of angular movement of said blade under flapping and drag as a result of shearing of said elastic material.

2. A device as claimed in claim 1, wherein the element or elements made of elastic material of the ball joint comprise two radially serrated rings (38, 39) adhesively bonded radially to the two rigid supports (21, 33) of the ball joint, between mutually opposite serrated surfaces of the said two rigid supports, in order to stiffen the connection between the ball-joint support (33) connected to the blade (9) and the rotor (21) of at least one rotary hydraulic jack in terms of rotation about the pitch axis (X—X) of the blade (9), so that any rotation of the jack rotor (21, 34) relative to the jack stator (18–20) is transmitted to the ball-joint support (33) connected to the blade (9), and therefore to the blade (9).

3. A device as claimed in claim 1, wherein the said surface of revolution in the form of a spherical cap (21) and the said jack vanes (20, 24) in the form of spherical segments are concentric relative to the ball joint (21, 33, 38–39).

4. A device as claimed in claim 1, wherein at least one cylindrical pitch and fixing bearing (18, 22–23) is connected to that (21) of the rigid supports (21, 33) of the ball joint which is integral in terms of rotation with at least one jack rotor (21, 24), and substantially coaxial relative to the other rigid support (33) of the ball joint.

5. A device as claimed in claim 1, wherein the ball joint (21, 33, 38–39) is radially in series, relative to the pitch axis (X—X) of the blade (9), with the axial stack of at least one rotary hydraulic jack (18–20, 21–24) and of at least one cylindrical pitch and fixing bearing (18, 22–23), and substantially concentric relative to the corresponding cylindrical bearing or cylindrical bearings.

6. A device as claimed in claim 1, wherein there is at least one detector (50) of the position of the corresponding blade (9), the said detector (50) being a rotation transducer of the inductive or capacitive type which comprises at least one movable member connected in terms of rotation to the rotor (21-24) of at least one rotary jack and mounted rotatably relative to a member fixed in relation to the stator (18-20) of the said rotary jack, so as to supply an output signal indicating the respective relative angular position of the movable and fixed members of the rotation transducer.

7. A device as claimed in claim 6, wherein at least one fixed member of each rotation transducer (50) is seated in an axial recess formed in an axial end part of the stator (18-20) of the jack and/or of a pitch and fixing pivot bearing (18-20) in an axial stack with the said jack stator (18-20), and at least one movable member of each rotation transducer (50) is mounted rotatably about an axis parallel to the pitch axis (X—X) of the blade (9) in the said fixed member or about the latter and is integral in terms of rotation with a pinion (51) outside the said jack and/or the said bearing and in engagement with the toothing (52) of a ring (53) integral in terms of rotation with the rotor (21-24) of the said jack.

8. A device as claimed in claim 7, wherein the toothed ring (53) has an annular form of revolution defined by the rotation about the pitch axis (X—X) of the blade (9) of a cross-section in the form of a U laid horizontally, so that the ring (53) has a radial flange supporting two coaxial tubular collars (54, 55), of which one (54) is fastened to the rotor (21-24) of the said jack and the other (55) carries the toothing (52) with radial teeth in engagement with the corresponding pinion (51) of each rotation transducer (50), each pinion (51) being seated in the recess delimited between the two collars (54, 55) and by the said flange of the ring (53) thus shaped as a cover for protecting the pinion or pinions (51) projecting axially relative to the stator (18-20) of the said jack and/or to the said part (23) of the bearing (18-23) in an axial stack with the said jack stator (18, 20).

9. A device as claimed in claim 1, wherein there is at least one hydraulic shock absorber (21, 22, 45, 46) for damping the angular movements of the blade (9) under drag.

10. A device as claimed in claim 9, wherein the hydraulic shock absorber is a rotary shock absorber of the type comprising a stator (21) and a rotor (33) which are substantially coaxial and which between them delimit at least one inner shock-absorber chamber (45) filled with a hydraulic fluid, such as a silicone oil or gel of high viscosity, and at least one shock-absorber vane (46) integral with the rotor (33) or stator (21) of the shock absorber and subdividing the inner chamber (45) into two damping chambers (45a, 45b) connected to one another by lamination means (47), so that any relative rotation of the shock-absorber stator (21) and shock-absorber rotor (33) about their common axis (B—B) causes a rotation of each vane (46) in the corresponding inner chamber (45), thereby compressing one of the two damping chambers (45a, 45b) and causing expansion in the other, so as to ensure a damping of the rotational movement as a result of the lamination, via the lamination means (47), of fluid circulating from the compressed chamber towards the expanded chamber, the shock-absorber stator (21) being integral in terms of rotation about the axis (X—X) of the blade (9) with the rotor (21-24) of at least one rotary hydraulic jack, and the shock-absorber rotor (33) being connected to the blade (9).

11. A device as claimed in claim 10, wherein the lamination means comprise a narrow passage (47) between the free end of each shock-absorber vane (46) carried by the shock-absorber rotor (33) or shock-absorber stator (21) and an opposite surface on the shock-absorber stator (21) or shock-absorber rotor (33) respectively.

12. A device as claimed in claim 10, wherein at least one rotary hydraulic jack (18-20, 21-24) and, where appropriate, at least one cylindrical pitch and fixing bearing (18, 22-23), at least one position sensor (50), a ball joint (21, 33, 38, 39), a rotary shock absorber (21, 33, 45, 46) and a play take-up device (116, 117, 122, 89) is or are mounted freely in terms of limited axial translational motion as a result of an axial assembly play of the stator (18-20) of the jack or jacks on the hub (1).

13. A device as claimed in claim 10, wherein each inner shock-absorber chamber (45) is sealed by at least one member made of elastic material (38, 39) connecting the shock-absorber rotor (33) to the shock-absorber stator.

14. A device as claimed in claim 10, wherein the hydraulic shock absorber (21, 22, 45–46) is radially in series, relative to the pitch axis (X—X) of the blade (9), with at least one rotary hydraulic jack (18–20, 21–24) and/or at least one axial stack of at least one rotary hydraulic jack and of at least one cylindrical bearing (18, 22–23).

15. A device as claimed in claim 10, wherein the hydraulic shock absorber (21, 33, 45, 46) is at least partially integrated in the ball joint (21, 33, 38–39), at least one inner shock-absorber chamber (45) being delimited at least partially between the rigid supports (21, 33) of the ball joint and/or in a recess of at least one of the said rigid supports.

16. A device as claimed in claim 15, wherein the shock-absorber stator (21) and rotor (33) and at least one member made of elastic material (38, 39) connecting them to one another consist respectively of the rigid support (21) of the ball joint which is integral in terms of rotation with the rotor (21–24) of at least one rotary hydraulic jack, of the rigid support (33) of the said ball joint which is connected in terms of torsion to the blade (9), and of at least one element made of elastic material (39, 38) connecting the rigid supports (21, 33) of the ball joint.

17. A device as claimed in claim 10, wherein the hydraulic shock absorber possesses two shock-absorber vanes (46) substantially radial and symmetrical relative to one another in relation to the relative axis of rotation (B—B) of the shock-absorber rotor (33) and stator (21), the vanes (46) being integral with the shock-absorber stator (21), and each of them extending substantially perpendicularly relative to the drag plane (T—T) of the blade (9) and substantially symmetrically above and below this drag plane (T—T), respectively in one of two shock-absorber chambers (45), each delimited by a recess extending radially and circumferentially in the rotor (33) of the shock absorber, by a part of the radial surface of the shock-absorber stator (21) opposite the corresponding recess in the shock-absorber rotor (33) and round the root of the vane (45) engaged in this recess, and by portions of annular surfaces of the member or members made of elastic material (38, 39) connecting the shock-absorber stator to the shock-absorber rotor (33).

18. A device as claimed in claim 17, wherein the recesses of the shock-absorber rotor (33) accommodating the shock-absorber vanes (46) are closed radially outwards by means of a peripheral casing (36) mounted sealingly (42) and removably on the perimeter of the shock-absorber rotor (33).

19. A device as claimed in claim 17, wherein each shock-absorber vane (46) is fastened unremovably, preferably by electron-beam welding, to the said portion of the face of the shock-absorber stator (21) which forms the bottom of a recess accommodating the vane (46).

20. A device as claimed in claim 17, wherein each inner chamber (45) of the hydraulic shock absorber is connected by means of at least one communication passage (58, 59) to at least one chamber (56) for compensating the expansions of the hydraulic damping fluid pressurized by means of a pressurizing mechanism (57) ensuring static pressurization of the shock absorber (21, 33, 45, 46).

21. A device as claimed in claim 20, wherein the communication passage or communication passages (58, 59) between a compensation chamber (56) and an inner shock-absorber chamber (45) is or are calibrated so as to form a dynamic filter for the operating frequencies of the shock absorber.

22. A device as claimed in claim 33, wherein the communication passage or communication passages between the inner shock-absorber chamber (45) and the compensation chamber (56) is or are delimited by a radial play (59) between the peripheral casing (36) on the one hand and the shock-absorber rotor (33) and/or a rigid support of the ball joint on the other hand.

23. A device as claimed in claim 20, wherein the pressurizing mechanism comprises at least one preferably elastically deformable flexible diaphragm (57) which at least partially delimits the corresponding compensation chamber (56).

24. A device as claimed in claim 23, wherein the flexible diaphragm is a sealed bladder (57) seated in the said compensation chamber and inflatable from outside the pressurizing mechanism.

25. A device as claimed in claim 24, wherein the sealing of the compensation chamber (56) is ensured by at least one element made of elastic material (38, 39, 40) preferably belonging to the shock absorber and/or to the ball joint.

26. A device as claimed in claim 20, wherein at least one compensation chamber (56) is at least partially delimited between the shock-absorber rotor (33) and stator (21) and/or in a recess of one of the said shock-absorber rotor (33) and stator (21), and the sealing of the said compensation chamber (56) is ensured by at least one elastic element (38, 39, 40) for connecting the shock-absorber rotor (33) to the shock-absorber stator (21).

27. A device as claimed in claim 26, wherein there are two hydraulic compensation chambers (56) substantially symmetrical relative to one another in relation to the relative axis of rotation (B—B) of the shock-absorber rotor (33) and stator (21) and in relation to the drag plane (T—T) of the blade (9), each being delimited at least partially by one of the two recesses extending circumferentially, in positions alternating in this direction with the recesses of the shock-absorber chambers (45), in one of the shock-absorber rotor (33) and stator (21) and/or of the rigid supports (21, 33) of the ball joint and/or in at least one part of at least one elastic element (38, 39, 40) of the shock absorber and/or of the ball joint.

28. A device as claimed in claim 20, wherein each inner shock-absorber chamber (45) is separated from each of the compensation chambers (56) between which it is located, in the circumferential direction, by a solid part made of viscoelastic material (40) integral with the element or elements made of elastic material (38, 39) connecting to one another the shock-absorber rotor (33) and stator (21) and/or the two rigid supports (21, 33) of the ball joint.

29. A device as claimed in claim 20, wherein at least one of the pitch and fixing bearings is a plain dry bearing (78, 82–83), with at least one self-lubricating ring (89) seated in an annular retaining groove in that (82, 83) of two mutually opposite cylindrical bearing surfaces of this bearing which is located on the jack rotor (81–84) and/or the shock-absorber stator (81) and/or the rigid support (81) of the ball joint which is connected to the jack rotor (81–84).

30. A device as claimed in claim 29, wherein there is also a device for the automatic take-up of the play of at least one pitch and fixing bearing (78, 82–83).

31. A device as claimed in claim 30, wherein the device for the automatic take-up of play is a hydraulic device comprising at least one compensation chamber (116) filled with a hydraulic fluid pressurized by means of at least one pressurizing mechanism (117) and in communication with each of the retaining grooves of the bearing (78, 82–83) via at least one conduit (122) opening out between the bottom of the groove and the corresponding self-lubricating ring (89) mounted sealingly in the said groove, so that the take-up of play is ensured as a result of the diametral displacement of the ring (89) under the action of the pressure of the hydraulic fluid in the compensation chamber or compensation chambers (116) of the play take-up device.

32. A device as claimed in claim 31, wherein the mechanism for pressurizing a compensation chamber (116) of the play take-up device comprises at least one preferably elastically deformable flexible diaphragm (117) delimiting at least partially the said compensation chamber (116).

33. A device as claimed in claim 32, wherein the said flexible diaphragm of the pressurizing mechanism of the play take-up device is a sealed inflatable bladder (117) seated in the said corresponding compensation chamber (116).

34. A device as claimed in claim 33, wherein at least one chamber (116) for compensating the expansions of hydraulic fluid of the shock-absorber (81, 93) and its pressurizing mechanism (117) form simultaneously and respectively a compensation chamber of the hydraulic play take-up device (116, 117, 122, 89) and its pressurizing mechanism.

35. A device as claimed in claim 34, wherein the conduit or conduits (122) connecting a compensation chamber (116) to a retaining groove of a ring (89) of a bearing is or are calibrated so as to form a dynamic filter for the operating frequencies of the shock absorber (81, 93).

36. A device as claimed in claim 44, wherein the hydraulic play take-up device is at least partially integrated in the hydraulic shock absorber.

37. A device as claimed in claim 1, wherein the ball joint (21, 33, 38, 39) and the rotary hydraulic shock absorber (21, 33, 45, 46) radially surround a rotary hydraulic jack, the rotor (21–24) of which surrounds the jack stator (18–20) radially, the shock-absorber rotor (33) possessing at least one rigid annular support (34, 35) in the outer radial position, an d which possesses, radially inward, portions (37) of concave surfaces adhesively bonded to elements of visco-elastic material (38, 39) likewise adhesively bonded to portions (32) of convex surfaces arranged radially outwards on the shock-absorber stator (21) which possesses at least one rigid annular support (30, 31) in the intermediate radial position, and which itself radially surrounds the jack stator (18–20) in the inner radial position.

38. A device as claimed in claim 37, wherein a rotary hydraulic jack, the rotor (21–24) of which surrounds the stator (18–20), is arranged in a recess made in the inner radial face of the shock-absorber stator (21) and/or of the rigid support (21) of the ball joint which is connected to the rotor (21–24) of the rotary jack.

39. A device as claimed in claim 37, wherein the rotor (21–24) of the rotary hydraulic jack at the same time forms the shock-absorber stator (21) and has portions of outer and inner radial faces which are respectively convex and concave portions of spheres centered on the center (C) of the ball joint (21, 33, 38, 39).

40. A device as claimed in claim 39, wherein the shock-absorber rotor and the rigid support of the ball joint which is integral with the blade (9) in terms of torsion about the pitch axis (X—X) of the blade consist essentially and simultaneously of an outer radial reinforcement (33) connected by means of the said elastic material (38, 39, 40) to an inner radial reinforcement (21) which at the same time forms the other rigid support of the ball joint, the shock-absorber stator carrying each shock-absorber vane (46) projecting radially outwards, and the rotor of the rotary jack carrying the movable vane or movable vanes (24) of the jack projecting radially inwards, opposite the jack stator which is shaped as a cylindrical sleeve (18) carrying the fixed jack vane or vanes (20) projecting radially outwards.

41. A device as claimed in claim 40, wherein the cylindrical sleeve (18) and the inner reinforcement (21), on one side and/or the other of their jack vanes (20, 24) in the axial direction, have radially opposite cylindrical bearing surfaces forming a plain pitch and fixing bearing (18 -22, 18–23), in the region of which the sealing of the rotary jack is ensured by at least one gasket (28, 29) seated in a radial groove made in one of the two mutually opposite bearing surfaces.

42. A device as claimed in claim 40, wherein the cylindrical sleeve (18) of the jack stator has inner axial flutes (19), by means of which it is intended to come into engagement with outer axial flutes on the periphery of a protuberance (3) of the hub (1), onto which the sleeve (18) is intended to be fixed in order to be immobilized in terms of rotation about its axis (X—X).

43. A device as claimed in claim 40, wherein at least one of the axial ends parts of the cylindrical sleeve (18) is pierced with at least one conduit (27) for connecting at least one chamber of variable volume (25) of the jack to a hydraulic circuit located outside the device (17).

44. A rotor hub for variable-pitch rotor of a rotary-wing aircraft, of the type comprising a central body (2) of a hub (1), centered on an axis of rotation (A) of said hub, and extensions (3) which are radial relative to said axis of rotation (A) and integral with said central body (2), said extensions being equal in number to the number of blades (9) of said rotor, so as each to ensure connection of a blade (9) to said hub (1), and further comprising hydraulic devices (17) for individual control of the pitch of a blade (9), said hydraulic devices being of a number equal to the number of blades (9), each of said hydraulic devices being mounted on said radial extension (3), so that a stator (18–20) of an at least one rotary hydraulic jack of a corresponding device is retained on a said extension (3) and immobilized against rotation about a pitch axis (X—X) of a corresponding blade (9), each of said hydraulic devices comprising (a) at least one double-acting rotary hydraulic jack (18-20, 21-24) adapted to be mounted on said rotor and to be driven in rotation with said rotor, said at least one jack having an axis of rotation coinciding with a longitudinal pitch-changing axis of said blade;

(b) at least one servo-distributor rotating with said rotor and controlling a supply of pressurized hydraulic fluid to said at least one jack, said servo-distributor connecting said jack to at least one hydraulic power circuit and being adapted to receive control signals indicating a state of at least one blade emanating from at least one detector means;

(c) said jack comprising a substantially tubular stator fixed to a central part of a hub of a head of said rotor and a substantially tubular rotor coaxial with said stator and being rotatably connected to said blade and comprising at least one inner chamber of variable volume delimited at least partially between said rotor and said stator and connected to at least one said servo-distributor;

(d) said stator and said rotor being coaxial about said pitch axis of said blade and having opposing lateral surfaces of revolution about their common axis, a first one of said lateral surfaces being a cylindrical surface of circular cross-section, and a second one of said lateral surfaces having the form of a spherical cap, at least one jack vane diametrically opposed relative to said common axis projecting from each of said lateral surfaces and extending to the immediate vicinity of the respective opposite lateral surface, each of said at least one jack having a convex shape facing toward said opposite lateral surface, said at least one jack vane projecting from said second lateral surface having the shape of a spherical segment connected by a convex face thereof to said spherical cap and having a face in the shape of a portion of a circular cylinder opposite said cylindrical surface, said at least one jack vane projecting from one of said lateral surfaces being circumferentially offset about said pitch axis relative to said at least one jack vane projecting from said opposite lateral surface, so as to delimit at least two chambers of variable volume with a small leakage flow from one said chamber to the other via a small radial play between said jack vanes and said opposite surfaces of revolution;

(e) there being at least one axial stack, substantially concentric with said pitch axis, of at least one said rotary hydraulic jack and of at least one cylindrical pivot bearing for the pitch of said blade and for attachment on said hub enabling said blade to rotate about said pitch axis relative to said hub, said rotor of at least one jack being mounted for rotation, relative to a corresponding stator by means of at least one said cylindrical pivot bearing, said bearing comprising two axially spaced pairs of facing cylindrical bearing surfaces, a rotor and a stator of at least one rotary hydraulic jack being integrated between said pairs of bearing surfaces; and (f) a ball joint centered substantially on said pitch axis comprising at least one element of elastic material which element is at least partly in the form of at least a portion of at least one spherical cap retained between two rigid supports, one of said supports being integral with said blade in terms of torsion about said pitch axis of said blade, the other of said supports being integral in terms of rotation with the rotor of at least one said rotary hydraulic jack about said pitch axis, said ball joint being rigid circumferentially about said pitch axis while permitting, about a center of said ball joint, relative freedom of angular movement of said blade under flapping and drag as a result of shearing of said elastic material.

45. A rotor hub as claimed in claim 44, wherein each said radial extension (3) supports, for connection to a corresponding blade (9), at least one pitch bearing (18, 22-23) and, centered on the axis (X—X) of the pitch bearing, a ball joint (21, 33) with at least one element made of elastic material (38, 39, 40) allowing, about its center C, relative freedom of movement of the corresponding blade (9) under flapping and under drag, as a result of the shearing of the elastic material, wherein at least one rotary jack (18-20, 21-24) of a corresponding hydraulic device for individual control of the pitch of a blade (9) is combined with at least one pitch bearing (18, 22-23), and the rotor (21) of the rotary jack or rotary jacks of said hydraulic device is integral in terms of rotation about the axis (X—X) of said at least one pitch bearing with one (21) of two rigid supports (21, 33) of said ball joint, said at least one element of viscoelastic material (38, 39, 40) being mounted between said rigid supports.

46. A rotor hub as claimed in claim 44, of the type comprising, for each blade (9) of said rotor, a connecting member rigid under tension, but flexible under bending and torsion (4), coupled by means of a footing part (5) to a radial extension (3) and adapted to be coupled to a blade (9), in order to retain the blade counter to centrifugal force and in order to allow flapping and drag oscillations of said blade and angular variations of its pitch, and a member rigid under bending and torsion (14) connected to said radial extension (3) and adapted to be made integral in terms of rotation with said blade (9) about the pitch axis (X—X) of said blade, the connection of said member rigid under bending and torsion (14) to said radial extension (3) being made at least partially by means of the corresponding hydraulic device (17) for individual control of the pitch of a blade (9), so that said rotor (21) of said at least one rotary jack is connected in terms of rotation about the pitch axis (X—X) of said blade (9) to said member rigid under bending and torsion (14).

47. A rotor hub as claimed in claim 46, of the type comprising, for connecting each blade (9) to a corresponding radial extension (3), a combined device (17) of a pitch bearing (18, 22-23) with an elastic ball joint (21, 33, 38, 39, 40) and with a hydroelastic shock-absorber (21, 33, 45, 46), said shock absorber being rotary and integrated in said ball joint and comprising at least one elastic element (38, 39) retained between two rigid supports (21, 33), a first one (33) of said supports being fixed to a corresponding blade (9) and a second one (21) of said supports being connected to said extension (3) by means of at least one pitch bearing (18, 22, 23), so that the combined bearing device (17) allows angular variation of the pitch of a corresponding blade (9) as a result of rotation of said ball joint and shock absorber about the axis (X—X) of said at least one pitch bearing and ensures incorporated damping of drag oscillations of said blade (9), the corresponding hydraulic device for individual control of the pitch being at least partially integrated in said corresponding combined bearing device (17), so that at least one rotary jack (18-20, 21-24) is arranged inside said ball joint and said shock absorber (21, 38, 39, 33) and is stacked axially with at least one pitch bearing (18, 22, 23), the rotor (21-24) of said at least one rotary jack being integral with the second rigid support (21) of said ball joint.

48. A rotor hub as claimed in claim 47, of the type in which said connecting member flexible under bending and torsion is an elongate arm (4) forming a tie substantially radial relative to the axis (X) of said hub (1) for retaining the corresponding blade (9) counter to centrifugal force, an inner radial end part (5) of said arm (4)

forming said footing part which is retained inside a corresponding radial extension (3), of cylindrical and tubular shape, of an axis (X—X) substantially perpendicular to the axis of rotation (A) of said hub (1), while an outer radial end part (7) of said arm (4) is fixed both to an intermediate connection piece (8) serving as a fastening for a corresponding blade (9) and to an outer radial end part (15) of said member rigid under bending and torsion and comprising a rigid cuff (14) which surrounds said elongate arm (4) without contact up to the vicinity of said central body (2) of said hub (1) and having an inner radial end part (16) bearing on said tubular extension (3) by means of said combined bearing device (17), about said footing (5) of said elongate arm (4), the corresponding hydraulic device for individual control of the pitch of the corresponding blade (9) being mounted about said tubular extension (3) by means of at least one cylindrical sleeve (18) which is integral with at least one stator (18-20) of a rotary jack of said device and which is fitted onto said tubular extension (3) and immobilized against rotation relative to said extension (3) by means of axial flutes (19) in engagement with matching flutes on said extension (3).

49. A rotor hub as claimed in claim 44, wherein said central body (2) of said hub (1) is tubular and accommodates a hydraulic servo-distributor (49) mounted as a reference rotating with said hub (1) and communicating via rigid pipelines (48) with each of said rotary jacks (18-20, 21-24) of said hydraulic devices for individual control of the pitch of said blades.

50. A rotor hub as claimed in claim 44, wherein each servo-distributor for feeding a rotary jack (18-20, 21-24) of a hydraulic device for individual control of the pitch of a blade is a servo-distributor of the servo-valve type, each servo valve (9) of said servo-distributor being mounted directly on said stator (18) of said jack.

51. A variable-pitch rotor for a rotary-wing aircraft, said rotor comprising a rotor hub (1) driven in rotation about an axis of rotation (A) of the rotor by means of a rotor mast, said hub (1) comprising a central body (2) which is tubular, integral with one end of the likewise tubular rotor mast and coaxial relative to the said rotor mast, the rotary jacks (18-20, 21-24) of all the hydraulic devices for the individual control of the pitch of a blade (9) being connected to a servo-distributor accommodated in the central body (2) of the hub (1) and connected to at least one hydraulic power circuit accommodated at least partially in the rotor mast, said servo-distributor comprising servo valves which are of the electrically controlled type and which are mounted as a rotary reference between at least one rotary servo-distributor and the corresponding rotary jacks (19-20, 21-24), and blades (9), each of which is retained on the hub (1) by means of at least one connecting member (4) rigid under tension, but flexible under bending and torsion, allowing the flapping and drag oscillations of the corresponding blade (9) and the angular variations of its pitch under the effect of a member rigid under bending and torsion (14) which is connected to the blade (9), wherein there is also, for each blade (9), a rotary-reference pitch-control system designed as a hydraulic and rotary servo-control which comprises a hydraulic device for the individual control of the pitch of a blade (9), mounted such that the stator (18) of the rotary jacks of the said hydraulic device is retained on the hub (1) and immobilized on the latter against rotation about a pitch axis (X—X) of a corresponding blade (9), while the rotor (21) of the rotary jacks is connected in rotatably to the member (14) rigid under bending and torsion about said pitch axis (X—X).

* * * * *